US012587896B2

(12) United States Patent
Abdelghaffar et al.

(10) Patent No.: US 12,587,896 B2
(45) Date of Patent: Mar. 24, 2026

(54) NULL RESOURCES CONFIGURATION FOR CHANNEL ESTIMATION

(71) Applicant: QUALCOMM INCORPORATED, San Diego, CA (US)

(72) Inventors: Muhammad Sayed Khairy Abdelghaffar, San Jose, CA (US); Runxin Wang, San Diego, CA (US); Yu Zhang, San Diego, CA (US); Jay Kumar Sundararajan, San Diego, CA (US); Alexandros Manolakos, Escondido, CA (US); Ahmed Elshafie, San Diego, CA (US); Krishna Kiran Mukkavilli, San Diego, CA (US); Hwan Joon Kwon, San Diego, CA (US); Tingfang Ji, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 399 days.

(21) Appl. No.: 18/044,907

(22) PCT Filed: Nov. 23, 2020

(86) PCT No.: PCT/CN2020/130740
§ 371 (c)(1),
(2) Date: Mar. 10, 2023

(87) PCT Pub. No.: WO2022/104766
PCT Pub. Date: May 27, 2022

(65) Prior Publication Data
US 2023/0370890 A1 Nov. 16, 2023

(51) Int. Cl.
*H04L 25/02* (2006.01)
*H04L 1/00* (2006.01)
(Continued)

(52) U.S. Cl.
CPC ....... *H04W 28/0268* (2013.01); *H04L 1/0068* (2013.01); *H04L 25/0202* (2013.01); *H04W 76/30* (2018.02)

(58) Field of Classification Search
None
See application file for complete search history.

(56) References Cited

U.S. PATENT DOCUMENTS

2009/0268680 A1* 10/2009 Nam ..................... H04W 64/00
370/329
2016/0211960 A1 7/2016 Wang et al.
(Continued)

FOREIGN PATENT DOCUMENTS

CN 106455087 A 2/2017
KR 20180099412 A * 9/2018 ........... H04L 5/0078

OTHER PUBLICATIONS

Ericsson: "Updated Summary of 7.2.3.1 Enhancements to Support NR Backhaul links", 3GPP TSG RAN WG1 Meeting #94bis, R1-1812042, 3rd Generation Partnership Project, Mobile Competence Centre, 650, Route Des Lucioles, F-06921 Sophia-Antipolis Cedex, France, vol. RAN WG1, No. Chengdu, China, Oct. 8, 2018-Oct. 12, 2018 Oct. 12, 2018, XP051519366, 22 Pages.
(Continued)

*Primary Examiner* — The Hy Nguyen
(74) *Attorney, Agent, or Firm* — Holland & Hart LLP

(57) ABSTRACT

Methods, systems, and devices for wireless communications are described. Generally, the described techniques provide for a device such as a user equipment (UE), a base station, or both, to perform a channel noise and interference estimation based on a set of null resources in a data channel. The device may identify a first configuration for a set of demodulation reference signals (DMRSs) in a first set of time periods of a data channel and a second configuration for a set of null resources in a second set of time periods of the data channel. The second set of time periods may be nonoverlapping with the first set of time periods. The device may perform a channel estimation procedure on the data channel based on the null resources and the DMRS resources. The device may process data received via resources of the data channel based on the channel estimation procedure.

30 Claims, 20 Drawing Sheets

(51) Int. Cl.
H04W 28/02          (2009.01)
H04W 76/30          (2018.01)

(56)                     References Cited

U.S. PATENT DOCUMENTS

| | | | |
|---|---|---|---|
| 2016/0286404 A1* | 9/2016 | Rico Alvarino ..... | H04B 17/345 |
| 2018/0092080 A1* | 3/2018 | Kim ...................... | H04L 5/0053 |
| 2018/0131490 A1* | 5/2018 | Patel ..................... | H04W 72/23 |
| 2018/0359069 A1 | 12/2018 | Nam et al. | |
| 2019/0090199 A1* | 3/2019 | Kim ................... | H04W 52/325 |
| 2019/0140801 A1* | 5/2019 | Ko ........................ | H04L 1/0026 |
| 2020/0044796 A1* | 2/2020 | Yang .................... | H04W 56/00 |
| 2021/0029647 A1* | 1/2021 | Matsumura ........... | H04W 52/18 |
| 2021/0153205 A1* | 5/2021 | Takeda ................. | H04W 72/23 |
| 2022/0312430 A1* | 9/2022 | Mozaffari ........... | H04L 27/2602 |
| 2023/0121167 A1* | 4/2023 | Cui ........................ | H04W 8/24 |
| | | | 370/252 |

OTHER PUBLICATIONS

International Search Report and Written Opinion—PCT/CN2020/130740—ISAEPO—Jul. 29, 2021 (2100090WO1).

* cited by examiner

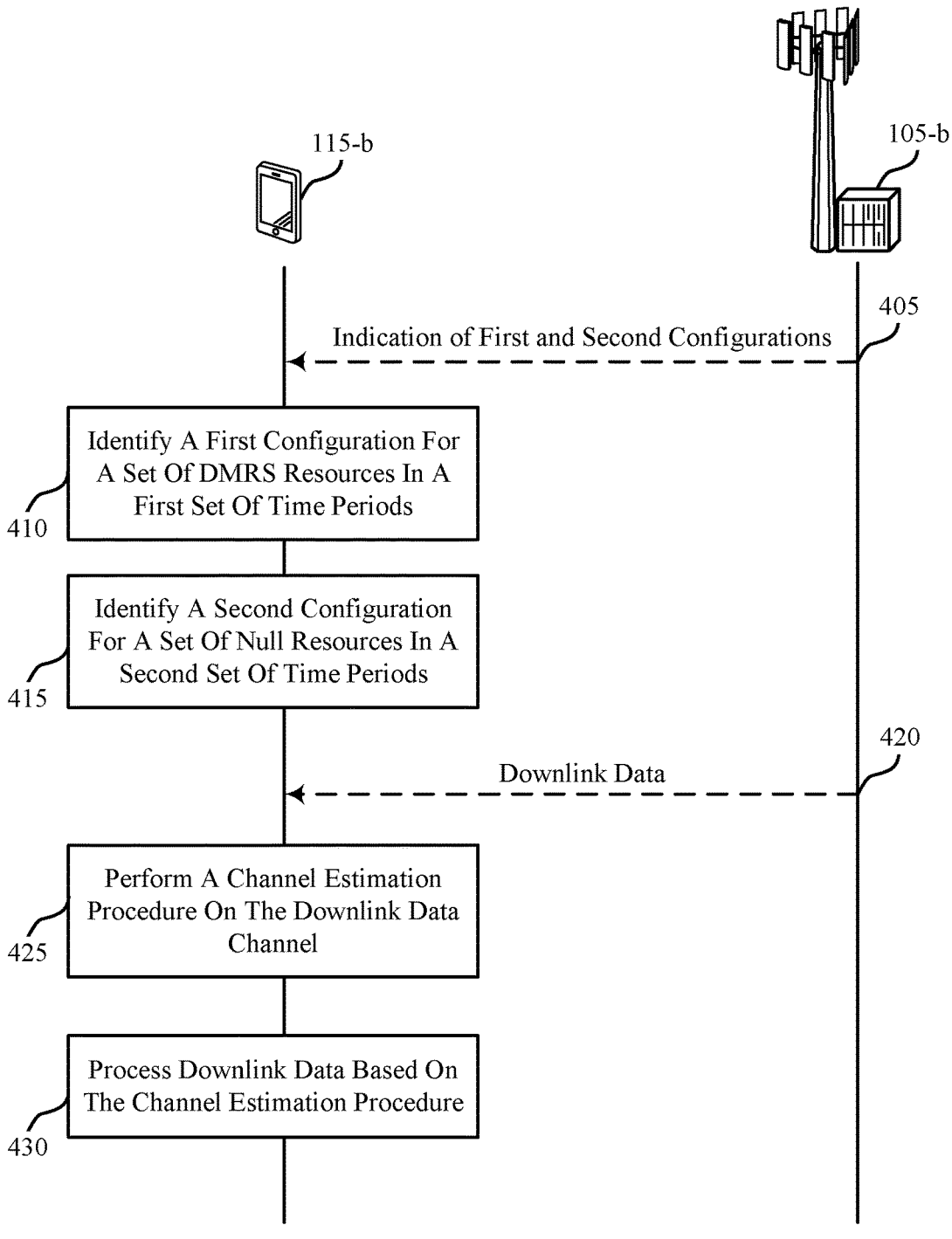

115-b 105-b

405

Indication of First and Second Configurations

Identify A First Configuration For
A Set Of DMRS Resources In A
First Set Of Time Periods

410

Identify A Second Configuration
For A Set Of Null Resources In A
Second Set Of Time Periods

415

420

Downlink Data

Perform A Channel Estimation
Procedure On The Downlink Data
Channel

425

Process Downlink Data Based On
The Channel Estimation Procedure

Identify A First Configuration For A Set Of DMRS Resources In A First Set Of Time Periods — 505

Identify A Second Configuration For A Set Of Null Resources In A Second Set Of Time Periods — 510

515 — Uplink Data

Perform A Channel Estimation Procedure On The Uplink Data Channel — 520

Process The Uplink Data Based On The Channel Estimation Procedure — 525

500

| Resource Configuration Component | | Channel Estimation Component |
|---|---|---|
| 825 | | 830 |
| Processing Component | | Rate Matching Component |
| 835 | | 840 |
| Puncturing Component | | Null Resource Component |
| 845 | | 850 |
| DMRS Component | | TBS Calculation Component |
| 855 | | 860 |
| Demodulation Component | | |
| 865 | | |

820

800

Communications Manager

Resource Configuration
Component

1125

Receiver

1110

Channel Estimation Component

1130

Transmitter

1115

Processing Component

1135

1120

1105

1100

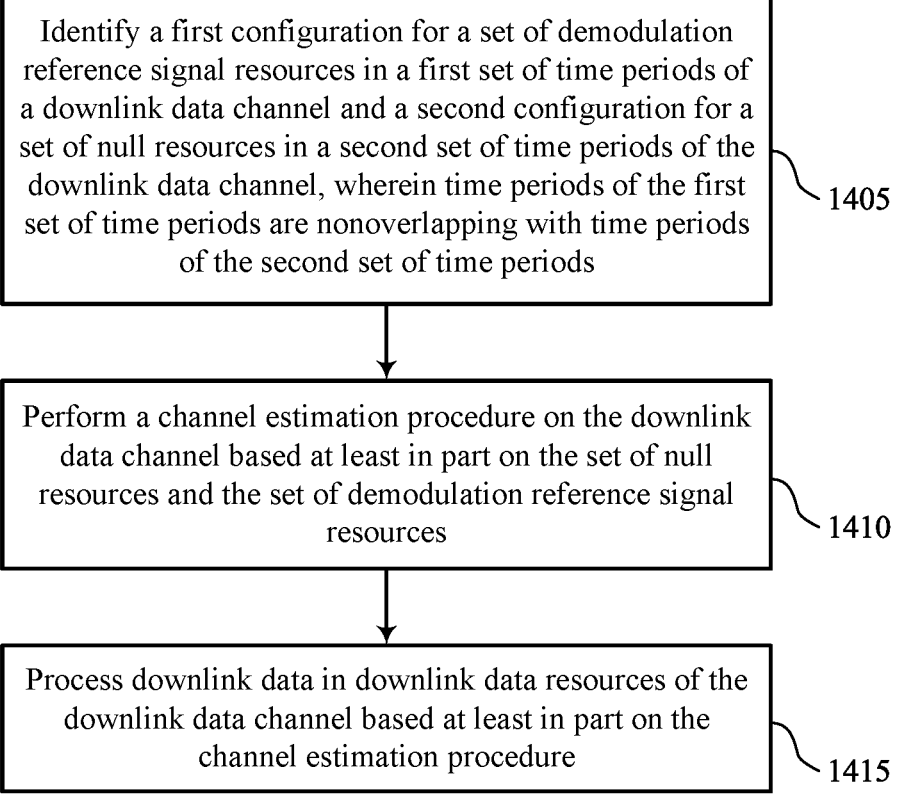

Identify a first configuration for a set of demodulation reference signal resources in a first set of time periods of a downlink data channel and a second configuration for a set of null resources in a second set of time periods of the downlink data channel, wherein time periods of the first set of time periods are nonoverlapping with time periods of the second set of time periods

1405

Perform a channel estimation procedure on the downlink data channel based at least in part on the set of null resources and the set of demodulation reference signal resources

1410

Process downlink data in downlink data resources of the downlink data channel based at least in part on the channel estimation procedure

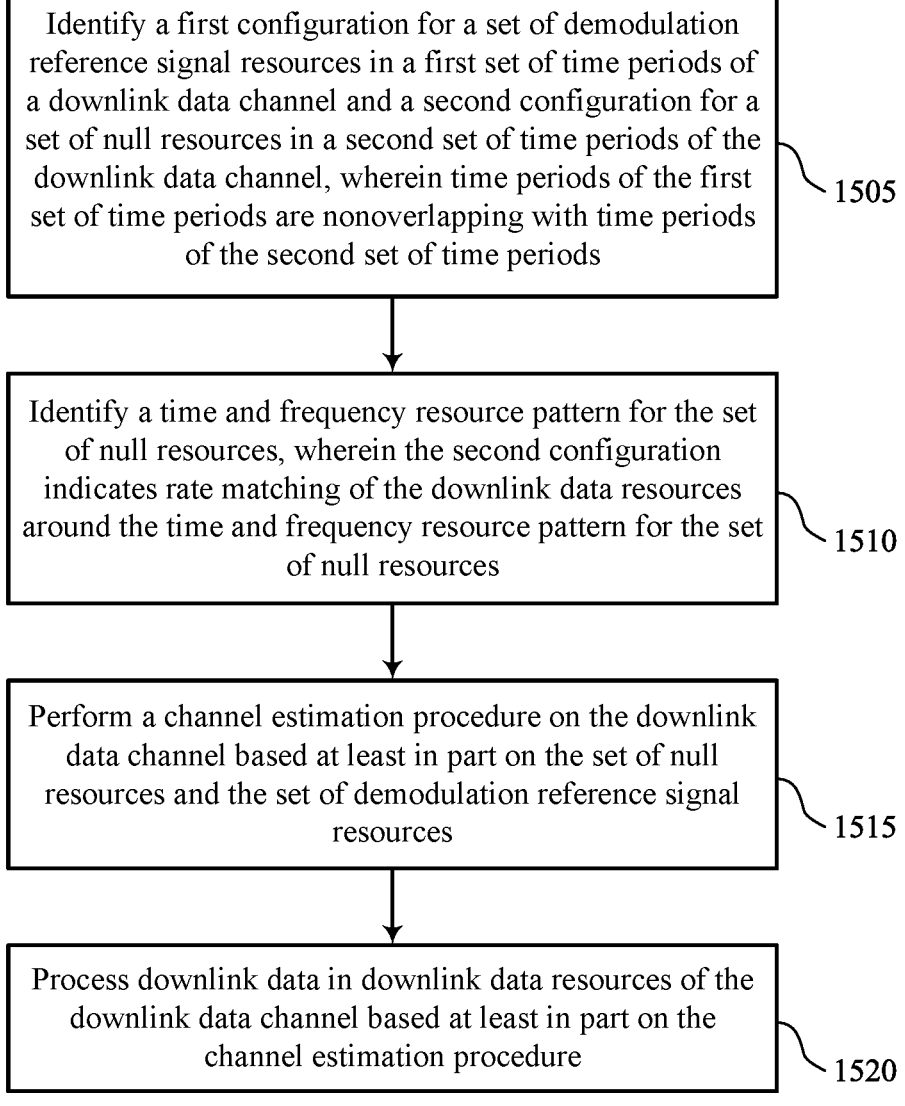

Identify a first configuration for a set of demodulation reference signal resources in a first set of time periods of a downlink data channel and a second configuration for a set of null resources in a second set of time periods of the downlink data channel, wherein time periods of the first set of time periods are nonoverlapping with time periods of the second set of time periods

1505

Identify a time and frequency resource pattern for the set of null resources, wherein the second configuration indicates rate matching of the downlink data resources around the time and frequency resource pattern for the set of null resources

1510

Perform a channel estimation procedure on the downlink data channel based at least in part on the set of null resources and the set of demodulation reference signal resources

1515

Process downlink data in downlink data resources of the downlink data channel based at least in part on the channel estimation procedure

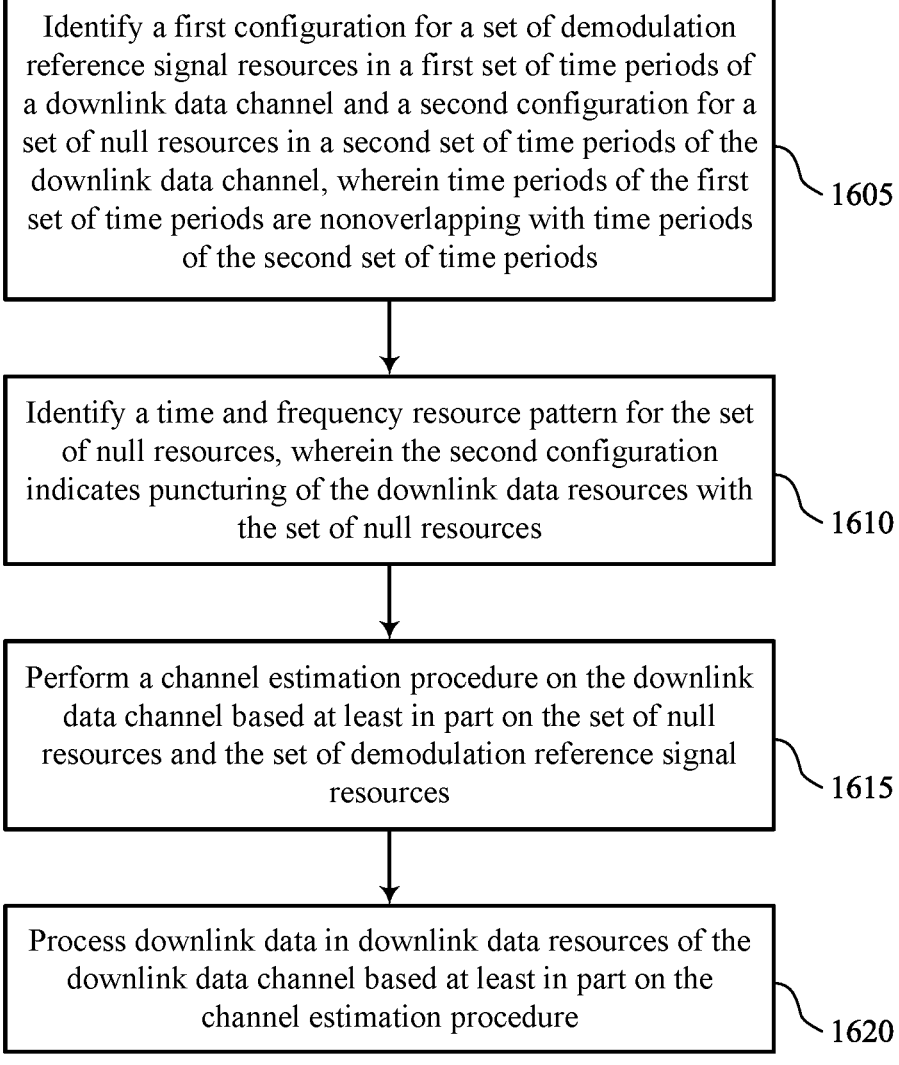

Identify a first configuration for a set of demodulation reference signal resources in a first set of time periods of a downlink data channel and a second configuration for a set of null resources in a second set of time periods of the downlink data channel, wherein time periods of the first set of time periods are nonoverlapping with time periods of the second set of time periods

1605

Identify a time and frequency resource pattern for the set of null resources, wherein the second configuration indicates puncturing of the downlink data resources with the set of null resources

1610

Perform a channel estimation procedure on the downlink data channel based at least in part on the set of null resources and the set of demodulation reference signal resources

1615

Process downlink data in downlink data resources of the downlink data channel based at least in part on the channel estimation procedure

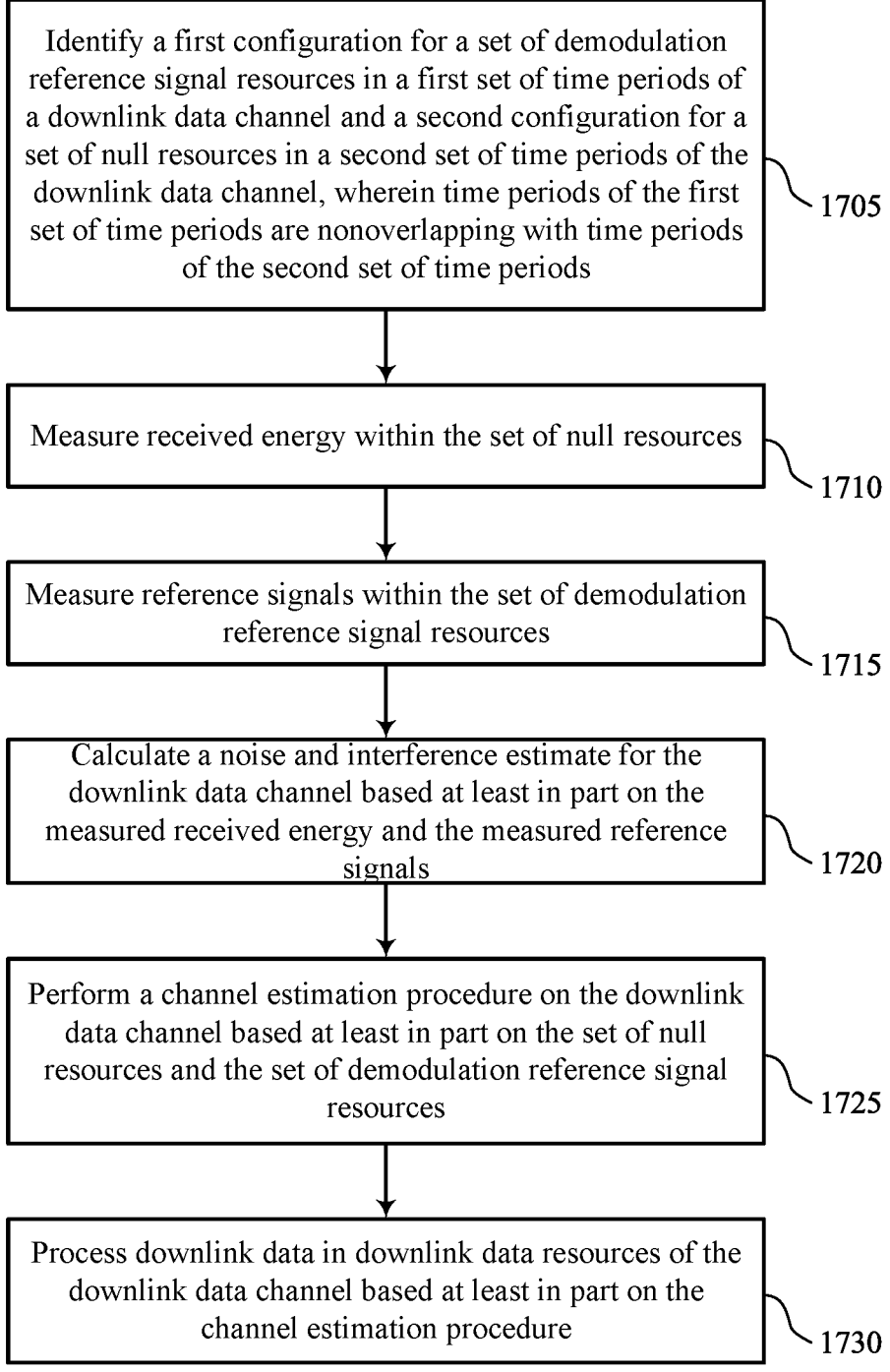

Identify a first configuration for a set of demodulation reference signal resources in a first set of time periods of a downlink data channel and a second configuration for a set of null resources in a second set of time periods of the downlink data channel, wherein time periods of the first set of time periods are nonoverlapping with time periods of the second set of time periods
1705

Measure received energy within the set of null resources
1710

Measure reference signals within the set of demodulation reference signal resources
1715

Calculate a noise and interference estimate for the downlink data channel based at least in part on the measured received energy and the measured reference signals
1720

Perform a channel estimation procedure on the downlink data channel based at least in part on the set of null resources and the set of demodulation reference signal resources
1725

Process downlink data in downlink data resources of the downlink data channel based at least in part on the channel estimation procedure
1730

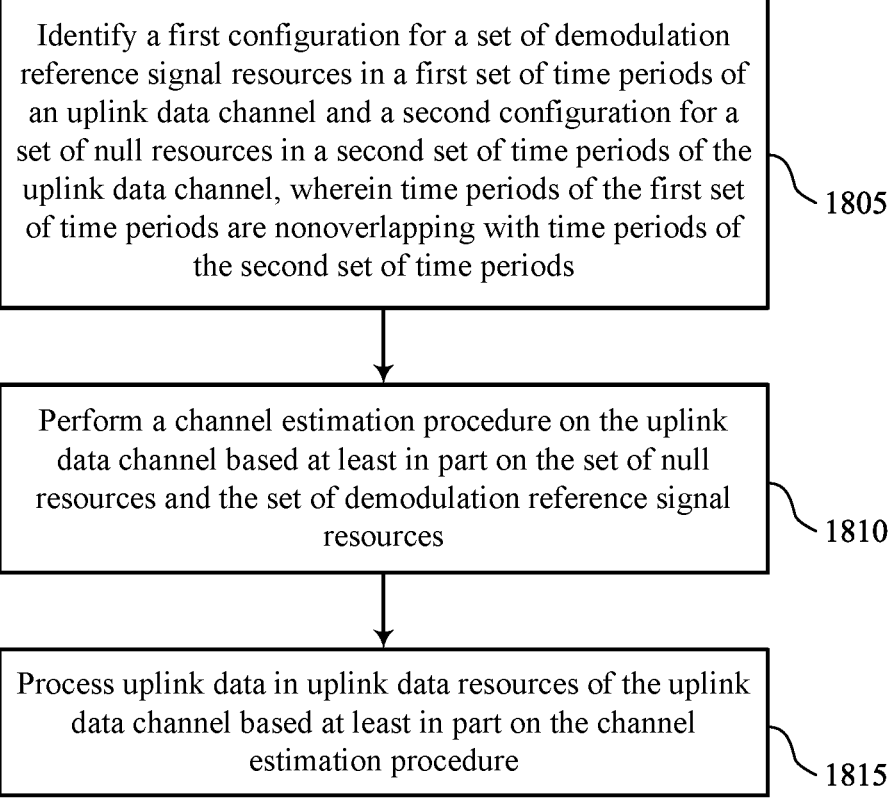

Identify a first configuration for a set of demodulation reference signal resources in a first set of time periods of an uplink data channel and a second configuration for a set of null resources in a second set of time periods of the uplink data channel, wherein time periods of the first set of time periods are nonoverlapping with time periods of the second set of time periods

1805

Perform a channel estimation procedure on the uplink data channel based at least in part on the set of null resources and the set of demodulation reference signal resources

1810

Process uplink data in uplink data resources of the uplink data channel based at least in part on the channel estimation procedure

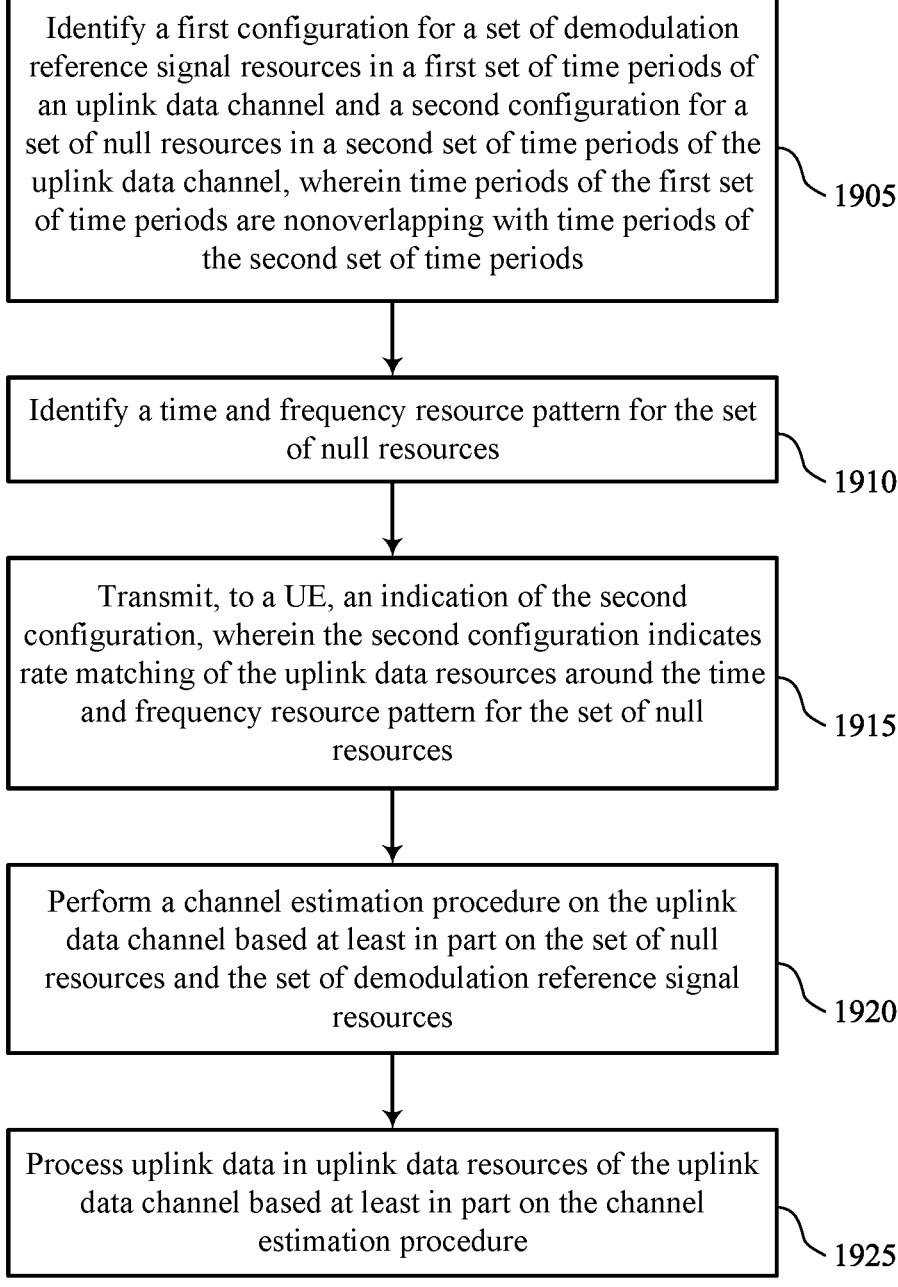

Identify a first configuration for a set of demodulation reference signal resources in a first set of time periods of an uplink data channel and a second configuration for a set of null resources in a second set of time periods of the uplink data channel, wherein time periods of the first set of time periods are nonoverlapping with time periods of the second set of time periods

1905

Identify a time and frequency resource pattern for the set of null resources

1910

Transmit, to a UE, an indication of the second configuration, wherein the second configuration indicates rate matching of the uplink data resources around the time and frequency resource pattern for the set of null resources

1915

Perform a channel estimation procedure on the uplink data channel based at least in part on the set of null resources and the set of demodulation reference signal resources

1920

Process uplink data in uplink data resources of the uplink data channel based at least in part on the channel estimation procedure

NULL RESOURCES CONFIGURATION FOR CHANNEL ESTIMATION

CROSS REFERENCE

The present application is a 371 national stage filing of International PCT Application No. PCT/CN2020/130740 by ABDELGHAFFAR et al. entitled "NULL RESOURCES CONFIGURATION FOR CHANNEL ESTIMATION," filed Nov. 23, 2020, which is assigned to the assignee hereof, and which is expressly incorporated by reference in its entirety herein.

FIELD OF TECHNOLOGY

The following relates to wireless communications, including null resources configuration for channel estimation.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

In some wireless communications systems, a device such as a UE or a base station may estimate noise and interference associated with a wireless communications channel (e.g., a channel noise and interference covariance (Rnn) estimation) before receiving data via the channel. In some cases, the Rnn estimation may be improved by increasing a number of reference signals in the channel for the device to estimate. However, increasing the number of reference signals may negatively impact the channel spectral efficiency. Thus, Rnn estimation by a wireless device may incur significant processing resources and reduced channel throughput.

SUMMARY

The described techniques relate to improved methods, systems, devices, and apparatuses that support null resources configuration for channel estimation. Generally, the described techniques provide for a user equipment (UE), a base station, or some other device to perform a channel noise and interference estimation for a data channel based on a set of null resources received via the data channel. For example, the device may identify a first configuration for a set of demodulation reference signal (DMRS) resources in a first set of time periods in a data channel and a second configuration for a set of null resources in a second set of time periods in the data channel. The set of DMRS resources and the set of null resources may be nonoverlapping such that the DMRS resources may be located in different time periods (e.g., symbols) than the null resources. The device may perform a channel estimation procedure on the data channel based on the set of null resources and the set of DMRS resources to improve the accuracy and reduce the complexity of the channel estimation procedure. The device may receive data via remaining resources of the data channel, and the device may process (e.g., demodulate) the received data based on the channel estimation procedure. The null resources may puncture the data resources, or the data resources may be rate matched around the null resources in the data channel. In some examples, the device may be a UE and the data channel may be a downlink data channel. Additionally or alternatively, the device may be a base station and the data channel may be an uplink data channel. By estimating Rnn based on measured energy in the null resources, the device may improve the Rnn estimation and the process for receiving and demodulating downlink or uplink data at the device.

A method for wireless communications by a UE is described. The method may include identifying a first configuration for a set of DMRS resources in a first set of time periods of a downlink data channel and a second configuration for a set of null resources in a second set of time periods of the downlink data channel, where time periods of the first set of time periods are nonoverlapping with time periods of the second set of time periods, performing a channel estimation procedure on the downlink data channel based on the set of null resources and the set of DMRS resources, and processing downlink data in downlink data resources of the downlink data channel based on the channel estimation procedure.

An apparatus for wireless communications by a UE is described. The apparatus may include a processor, memory in electronic communication with the processor, and instructions stored in the memory. The instructions may be executable by the processor to cause the apparatus to identify a first configuration for a set of DMRS resources in a first set of time periods of a downlink data channel and a second configuration for a set of null resources in a second set of time periods of the downlink data channel, where time periods of the first set of time periods are nonoverlapping with time periods of the second set of time periods, perform a channel estimation procedure on the downlink data channel based on the set of null resources and the set of DMRS resources, and process downlink data in downlink data resources of the downlink data channel based on the channel estimation procedure.

Another apparatus for wireless communications by a UE is described. The apparatus may include means for identifying a first configuration for a set of DMRS resources in a first set of time periods of a downlink data channel and a second configuration for a set of null resources in a second set of time periods of the downlink data channel, where time periods of the first set of time periods are nonoverlapping with time periods of the second set of time periods, means for performing a channel estimation procedure on the downlink data channel based on the set of null resources and the set of DMRS resources, and means for processing downlink data in downlink data resources of the downlink data channel based on the channel estimation procedure.

A non-transitory computer-readable medium storing code for wireless communications by a UE is described. The code may include instructions executable by a processor to identify a first configuration for a set of DMRS resources in a first set of time periods of a downlink data channel and a second configuration for a set of null resources in a second set of time periods of the downlink data channel, where time periods of the first set of time periods are nonoverlapping with time periods of the second set of time periods, perform a channel estimation procedure on the downlink data channel based on the set of null resources and the set of DMRS resources, and process downlink data in downlink data resources of the downlink data channel based on the channel estimation procedure.

Some examples of the method, apparatuses, and non-transitory computer-readable medium described herein may further include operations, features, means, or instructions for identifying a time and frequency resource pattern for the set of null resources, where the second configuration indicates rate matching of the downlink data resources around the time and frequency resource pattern for the set of null resources.

In some examples of the method, apparatuses, and non-transitory computer-readable medium described herein, the time and frequency resource pattern for the set of null resources may be based on a time and frequency resource pattern for the set of DMRS resources.

In some examples of the method, apparatuses, and non-transitory computer-readable medium described herein, the time and frequency resource pattern for the set of null resources may be based on a comb pattern of resource elements defined with respect to the downlink data channel.

Some examples of the method, apparatuses, and non-transitory computer-readable medium described herein may further include operations, features, means, or instructions for identifying the second configuration includes receiving radio resource control (RRC) signaling indicating the second configuration.

Some examples of the method, apparatuses, and non-transitory computer-readable medium described herein may further include operations, features, means, or instructions for identifying the second configuration includes receiving downlink control information (DCI) indicating the second configuration.

In some examples of the method, apparatuses, and non-transitory computer-readable medium described herein, the DCI includes an index to an indication of the time and frequency resource pattern for the set of null resources in a time domain resource allocation (TDRA) table.

In some examples of the method, apparatuses, and non-transitory computer-readable medium described herein, the DCI includes a bit field indicating the second configuration.

Some examples of the method, apparatuses, and non-transitory computer-readable medium described herein may further include operations, features, means, or instructions for calculating a transport block size (TB S) for the downlink data channel based on a number of resource elements associated with the set of null resources.

Some examples of the method, apparatuses, and non-transitory computer-readable medium described herein may further include operations, features, means, or instructions for identifying a time and frequency resource pattern for the set of null resources, where the second configuration indicates puncturing of the downlink data resources with the set of null resources.

Some examples of the method, apparatuses, and non-transitory computer-readable medium described herein may further include operations, features, means, or instructions for receiving DCI indicating the second configuration.

In some examples of the method, apparatuses, and non-transitory computer-readable medium described herein, the DCI includes an indication that puncturing may be enabled for the downlink data channel.

In some examples of the method, apparatuses, and non-transitory computer-readable medium described herein, the DCI includes an indication that puncturing may be disabled for the downlink data channel.

In some examples of the method, apparatuses, and non-transitory computer-readable medium described herein, the UE may be configured to determine whether the set of null resources punctured the downlink data resources based on a set of DCI parameters configured by a network.

In some examples of the method, apparatuses, and non-transitory computer-readable medium described herein, the set of DCI parameters includes one or more radio network temporary identifiers (RNTIs), one or more DCI formats, one or more search space identifiers (IDs), one or more control resource set (CORESET) IDs, or a combination thereof.

Some examples of the method, apparatuses, and non-transitory computer-readable medium described herein may further include operations, features, means, or instructions for determining that the set of null resources may be unavailable resources for the downlink data resources.

In some examples of the method, apparatuses, and non-transitory computer-readable medium described herein, performing the channel estimation procedure on the downlink data channel may include operations, features, means, or instructions for measuring received energy within the set of null resources, measuring reference signals within the set of DMRS resources, and calculating a noise and interference estimate for the downlink data channel based on the measured received energy and the measured reference signals.

In some examples of the method, apparatuses, and non-transitory computer-readable medium described herein, the noise and interference estimate includes a channel noise and interference covariance matrix.

Some examples of the method, apparatuses, and non-transitory computer-readable medium described herein may further include operations, features, means, or instructions for demodulating the downlink data based on the channel noise and interference covariance matrix.

In some examples of the method, apparatuses, and non-transitory computer-readable medium described herein, the UE includes a set of multiple receiver components.

A method for wireless communications by a base station is described. The method may include identifying a first configuration for a set of DMRS resources in a first set of time periods of an uplink data channel and a second configuration for a set of null resources in a second set of time periods of the uplink data channel, where time periods of the first set of time periods are nonoverlapping with time periods of the second set of time periods, performing a channel estimation procedure on the uplink data channel based on the set of null resources and the set of DMRS resources, and processing uplink data in uplink data resources of the uplink data channel based on the channel estimation procedure.

An apparatus for wireless communications by a base station is described. The apparatus may include a processor, memory in electronic communication with the processor, and instructions stored in the memory. The instructions may be executable by the processor to cause the apparatus to identify a first configuration for a set of DMRS resources in a first set of time periods of an uplink data channel and a second configuration for a set of null resources in a second set of time periods of the uplink data channel, where time periods of the first set of time periods are nonoverlapping with time periods of the second set of time periods, perform a channel estimation procedure on the uplink data channel based on the set of null resources and the set of DMRS resources, and process uplink data in uplink data resources of the uplink data channel based on the channel estimation procedure.

Another apparatus for wireless communications by a base station is described. The apparatus may include means for identifying a first configuration for a set of DMRS resources in a first set of time periods of an uplink data channel and a second configuration for a set of null resources in a second set of time periods of the uplink data channel, where time periods of the first set of time periods are nonoverlapping with time periods of the second set of time periods, means for performing a channel estimation procedure on the uplink data channel based on the set of null resources and the set of DMRS resources, and means for processing uplink data in uplink data resources of the uplink data channel based on the channel estimation procedure.

A non-transitory computer-readable medium storing code for wireless communications by a base station is described. The code may include instructions executable by a processor to identify a first configuration for a set of DMRS resources in a first set of time periods of an uplink data channel and a second configuration for a set of null resources in a second set of time periods of the uplink data channel, where time periods of the first set of time periods are nonoverlapping with time periods of the second set of time periods, perform a channel estimation procedure on the uplink data channel based on the set of null resources and the set of DMRS resources, and process uplink data in uplink data resources of the uplink data channel based on the channel estimation procedure.

Some examples of the method, apparatuses, and non-transitory computer-readable medium described herein may further include operations, features, means, or instructions for identifying a time and frequency resource pattern for the set of null resources and transmitting, to a UE, an indication of the second configuration, where the second configuration indicates rate matching of the uplink data resources around the time and frequency resource pattern for the set of null resources.

In some examples of the method, apparatuses, and non-transitory computer-readable medium described herein, the time and frequency resource pattern for the set of null resources may be based on a time and frequency resource pattern for the set of DMRS resources.

In some examples of the method, apparatuses, and non-transitory computer-readable medium described herein, the time and frequency resource pattern for the set of null resources may be based on a comb pattern of resource elements defined with respect to the uplink data channel.

Some examples of the method, apparatuses, and non-transitory computer-readable medium described herein may further include operations, features, means, or instructions for transmitting the indication of the second configuration via RRC information signaling.

Some examples of the method, apparatuses, and non-transitory computer-readable medium described herein may further include operations, features, means, or instructions for transmitting the indication of the second configuration via DCI.

In some examples of the method, apparatuses, and non-transitory computer-readable medium described herein, the downlink control information includes an index to an indication of the time and frequency resource pattern for the set of null resources in a TDRA table.

Some examples of the method, apparatuses, and non-transitory computer-readable medium described herein may further include operations, features, means, or instructions for calculating a TBS for the uplink data channel based on a number of resource elements associated with the set of null resources.

Some examples of the method, apparatuses, and non-transitory computer-readable medium described herein may further include operations, features, means, or instructions for identifying a time and frequency resource pattern for the set of null resources and transmitting, to a UE, an indication of the second configuration, where the second configuration indicates puncturing of the uplink data resources with the set of null resources.

Some examples of the method, apparatuses, and non-transitory computer-readable medium described herein may further include operations, features, means, or instructions for transmitting the indication of the second configuration via DCI.

In some examples of the method, apparatuses, and non-transitory computer-readable medium described herein, the DCI includes an indication that puncturing may be enabled for the uplink data channel.

In some examples of the method, apparatuses, and non-transitory computer-readable medium described herein, the downlink control information includes an indication that puncturing may be disabled for the uplink data channel.

Some examples of the method, apparatuses, and non-transitory computer-readable medium described herein may further include operations, features, means, or instructions for determining whether the set of null resources puncture the uplink data resources based on a set of parameters configured by a network and transmitting DCI based on the set of parameters.

In some examples of the method, apparatuses, and non-transitory computer-readable medium described herein, the set of parameters includes one or more RNTIs, one or more DCI formats, one or more search space IDs, one or more CORESET IDs, or a combination thereof.

Some examples of the method, apparatuses, and non-transitory computer-readable medium described herein may further include operations, features, means, or instructions for determining that the set of null resources may be unavailable resources for the uplink data resources.

In some examples of the method, apparatuses, and non-transitory computer-readable medium described herein, performing the channel estimation procedure on the uplink data channel may include operations, features, means, or instructions for measuring received energy within the set of null resources, measuring reference signals within the set of DMRS resources, and calculating a noise and interference estimate for the uplink data channel based on the measured received energy and the measured reference signals.

In some examples of the method, apparatuses, and non-transitory computer-readable medium described herein, the noise and interference estimate includes a channel noise and interference covariance matrix.

Some examples of the method, apparatuses, and non-transitory computer-readable medium described herein may further include operations, features, means, or instructions for demodulating the uplink data based on the channel noise and interference covariance matrix.

In some examples of the method, apparatuses, and non-transitory computer-readable medium described herein, the base station receives the uplink data from a set of multiple UEs.

In some examples of the method, apparatuses, and non-transitory computer-readable medium described herein, the base station includes a set of multiple receiver components.

BRIEF DESCRIPTION OF THE DRAWINGS

FIGS. 4 and 5 illustrate examples of process flows that support null resources configuration for channel estimation in accordance with aspects of the present disclosure.

FIGS. 14 through 20 show flowcharts illustrating methods that support null resources configuration for channel estimation in accordance with aspects of the present disclosure.

DETAILED DESCRIPTION

Figure 1:
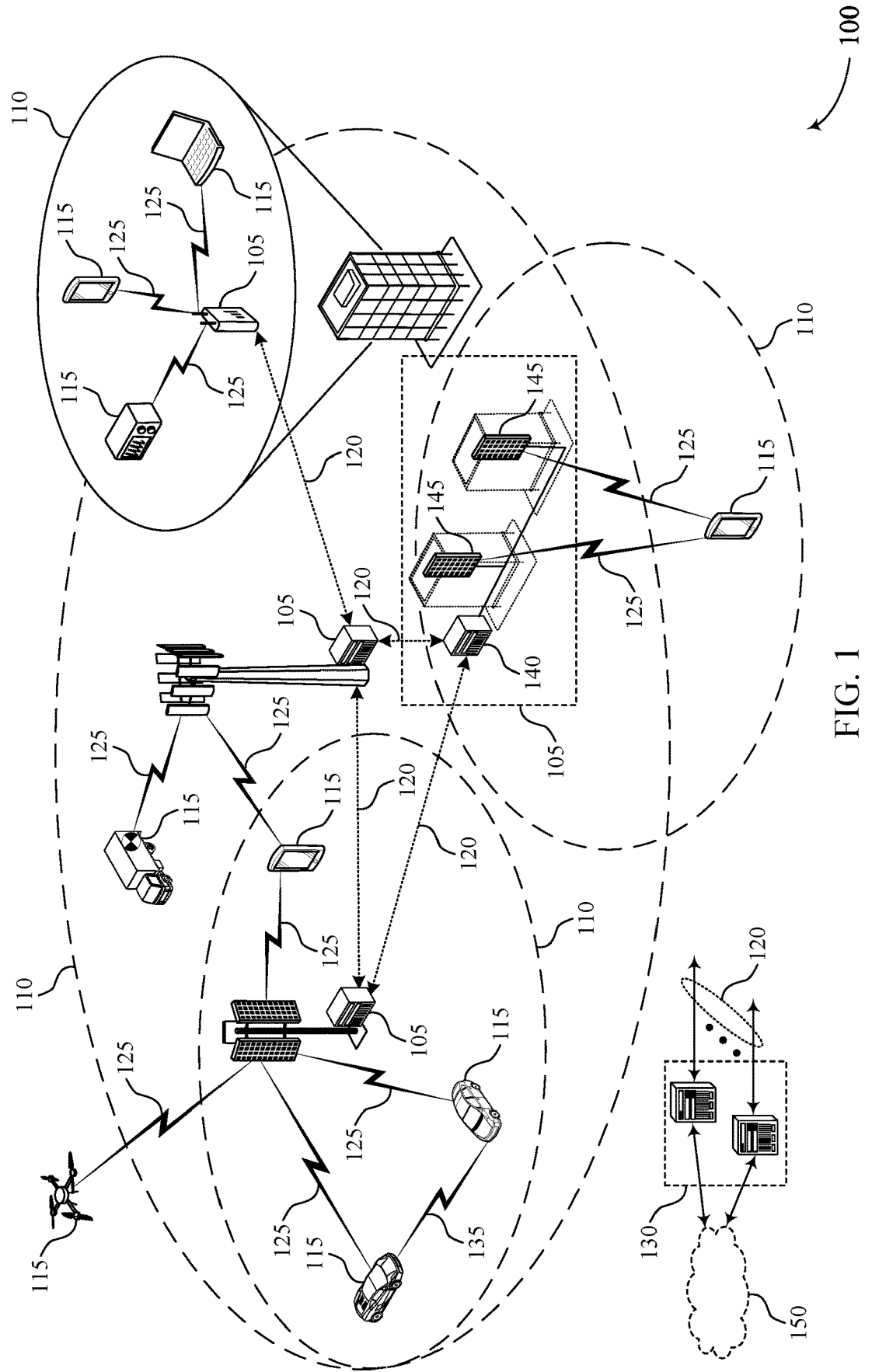
FIGS. 1 and 2 illustrate examples of wireless communications systems that support null resources configuration for channel estimation in accordance with aspects of the present disclosure.

In some wireless communications systems, a receiving device in the network (e.g., a user equipment (UE), base station, or some other node) may perform a channel estimation procedure on a data channel (e.g., a physical downlink shared channel (PDSCH), a physical uplink shared channel (PUSCH), or another data channel) for receiving data via the channel. The channel estimation procedure may include estimating a noise and interference covariance (Rnn) associated with the data channel (e.g., a Rnn matrix). In some cases, the device may perform the channel estimation procedure by measuring a set of reference signals (e.g., demodulation reference signals (DMRSs)). The DMRSs may be received via configured DMRS resources in the data channel. Some wireless devices may receive data from multiple other transmitting devices, may include a number of receiver components (e.g., eight receive antennas, four receive antennas, or some other number of receive antennas), or both. As the number of transmitting devices and the number of receiver components increases, the complexity associated with performing the channel estimation procedure may increase. For example, a number of elements in the Rnn matrix may increase as a number of receiver components increases, which may result in increased complexity of the Rnn estimation. In some examples, Rnn estimation may require significant processing resources and may increase latency associated with communications by the device.

The channel estimation procedure may be improved by increasing a number of resources which the device uses to estimate the Rnn (e.g., increasing the processing gain). In some cases, one or more DMRS resources may be replaced with null resources. These null resources may be empty resources within the DMRS resource configuration and a device may use the null resources to estimate Rnn. However, replacing DMRS resources with null resources may limit the scheduling flexibility of the null resources. For example, the null resources may be restricted to the time and frequency resources originally configured for the DMRS resources.

To improve the Rnn estimation while maintaining spectral efficiency and increasing scheduling flexibility, a set of null resources may be configured within the data channel. The null resources may be empty resources that are different from the DMRS resources. An energy measured in the null resources may be directly attributed to noise and interference in the data channel. A wireless device may identify a first configuration for the DMRS resources and a second configuration for the set of null resources. The second configuration may indicate a time and frequency pattern for the null resources in the data channel. The device may measure DMRSs received via the DMRS resources and measure energy received in the null resources. The device may estimate Rnn based on an average of the measured DMRSs and the measured received energy to improve the Rnn estimation.

In some examples, the second configuration for the set of null resources may indicate that the data resources of the data channel have been rate matched around the time and frequency resource pattern for the null resources. The device may receive an indication of the second configuration including the null resource rate matching pattern via control signaling such as radio resource control (RRC) signaling or via an indication in downlink control information (DCI). The device may calculate a transport block size (TBS) for the data channel based on a number of the null resources (e.g., a number of rate matched resources). Alternatively, the second configuration may indicate that the null resources punctured a set of the data resources. The device may receive an indication of the second configuration and the null resource puncturing pattern via DCI, or the network may configure one or more DCI parameters for determining the null resource puncturing pattern.

In some examples, the device may be a UE, and the data channel may be a downlink data channel. The UE may estimate Rnn based on null resources in the downlink data channel and demodulate downlink data based on the estimated Rnn. The UE may receive a configuration or indication of the null resource pattern from a base station or other network entity, and may locate and measure the Rnn resources accordingly. In other examples, the device may be a base station, and the data channel may be an uplink data channel. The base station may estimate Rnn based on null resources in the uplink data channel and demodulate uplink data based on the estimated Rnn. The base station may transmit an indication of the null resource pattern and whether puncturing or rate matching is enabled to a UE, and the UE may transmit the uplink data and the null resources via the uplink data channel based on the indicated null resource pattern.

Aspects of the disclosure are initially described in the context of wireless communications systems. Aspects of the disclosure are further illustrated by and described with reference to time and frequency resource blocks and process flows. Aspects of the disclosure are further illustrated by and described with reference to apparatus diagrams, system diagrams, and flowcharts that relate to null resources configuration for channel estimation.

FIG. 1 illustrates an example of a wireless communications system 100 that supports null resources configuration for channel estimation in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

The time intervals for the base stations 105 or the UEs 115 may be expressed in multiples of a basic time unit which may, for example, refer to a sampling period of $T_s = 1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same code-word) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a trans-mitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjust-ments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming opera-tions for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Trans-missions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with trans-missions along a single beam direction may be determined based on a signal that was transmitted in one or more beam directions. For example, a UE 115 may receive one or more of the signals transmitted by the base station 105 in different directions and may report to the base station 105 an indi-cation of the signal that the UE 115 received with a highest signal quality or an otherwise acceptable signal quality.

In some examples, transmissions by a device (e.g., by a base station 105 or a UE 115) may be performed using multiple beam directions, and the device may use a combi-nation of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feed-back (e.g., a multi-panel type codebook, a linear combina-tion type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent trans-mission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to differ-ent receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configu-ration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communi-cate over logical channels. A Medium Access Control (MAC) layer may perform priority handling and multiplex-ing of logical channels into transport channels. The MAC layer may also use error detection techniques, error correc-tion techniques, or both to support retransmissions at the MAC layer to improve link efficiency. In the control plane, the RRC protocol layer may provide establishment, configu-ration, and maintenance of an RRC connection between a UE 115 and a base station 105 or a core network 130 supporting radio bearers for user plane data. At the physical layer, transport channels may be mapped to physical channels.

In some examples, a UE 115, a base station 105, or some other device in a wireless communications system 100 may perform a channel noise and interference estimation for a data channel based on a set of null resources configured in the data channel. For example, the device may identify a first configuration for a set of DMRS resources in a first set of time periods (e.g., symbols) in a data channel and a second configuration for a set of null resources in a second set of time periods in the data channel. The set of DMRS resources and the set of null resources may be nonoverlapping such that the DMRS resources may be located in different time periods than the null resources. The device may perform a channel estimation procedure on the data channel based on the set of null resources and the set of DMRS resources. The channel estimation procedure may be more efficient and accurate by performing the estimation based on the set of null resources. In some examples, the device may be a UE 115 and the data channel may be a downlink data channel. The UE 115 may measure an energy received in the null resources, measure DMRSs received in DMRS resources, and receive downlink data via remaining resources of the downlink data channel (e.g., a PDSCH). The UE 115 may perform a channel estimation procedure based on the measured received energy and the measured DMRSs and the UE 115 may process (e.g., demodulate) the downlink data based on the channel estimation. Additionally or alternatively, the device may be a base station 105 and the data channel may be an uplink data channel (e.g., a PUSCH). The base station 105 may measure an energy received in the null resources, measure DMRSs received in DMRS resources, and receive uplink data via remaining resources of the uplink data channel. The base station 105 may perform a channel estimation procedure based on the measured received energy and the measured DMRSs and process the received uplink data based on the channel estimation procedure.

Figure 2:
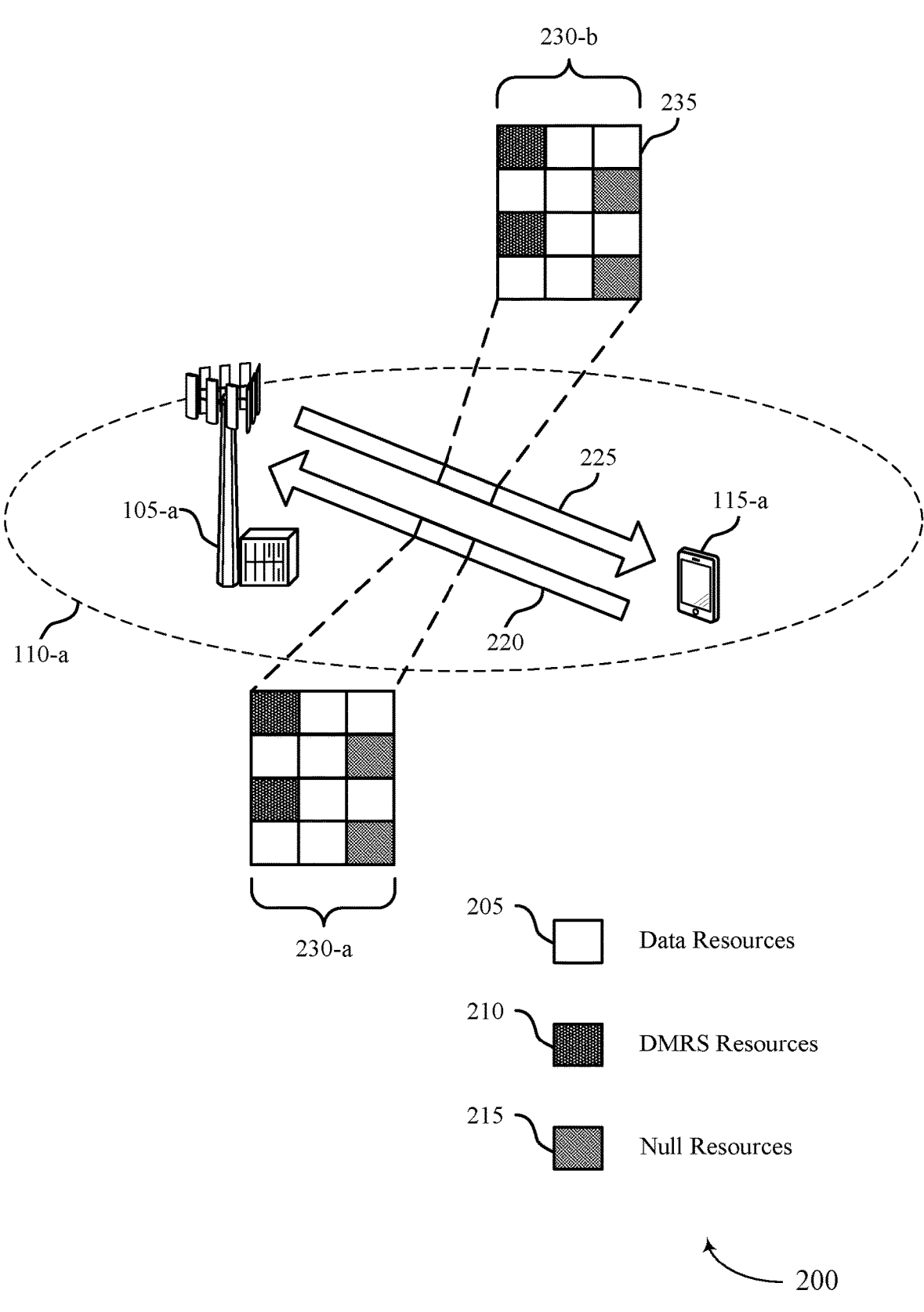

FIG. 2 illustrates an example of a wireless communications system 200 that supports null resources configuration for channel estimation in accordance with aspects of the present disclosure. The wireless communications system 200 may include base station 105-*a* and UE 115-*a*, which may be examples of a base station 105 and a UE 115 as described with reference to FIG. 1. Base station 105-*a* and UE 115-*a* may communicate within geographic coverage area 110-*a* and over uplink data channel 220 and downlink data channel 225. UE 115-*a* and base station 105-*a* may perform channel estimation procedures on the downlink data channel 225 and the uplink data channel 220, respectively, based on a set of null resources 215 transmitted via the channels to improve the accuracy and reduce the complexity of the channel estimation procedure.

In some wireless communications systems 200, a device in the network (e.g., a UE 115, a base station 105, or some other node) may perform a channel estimation procedure to estimate a channel (e.g., an amount of noise and interference associated with the channel) for receiving data at the device. For example, UE 115-*a* may perform a channel estimation procedure to estimate the downlink data channel 225 for receiving data from base station 105-*a* via the downlink data channel 225. Base station 105-*a* may perform a channel estimation procedure to estimate the uplink data channel 220 for receiving uplink data from UE 115-*a* via the uplink data channel 220. A channel estimation may include estimating a Rnn matrix. The estimated Rnn matrix may be used to improve accuracy and efficiency associated with decoding and demodulating data received via the channel. In some cases, Rnn estimation may be performed based on one or more reference signals received via the channel. For example, a device may measure one or more sounding reference signals (SRSs), one or more DMRSs (e.g., within the DMRS resources 210), or both, and the device may estimate Rnn based on the received reference signals.

In some cases, the number of elements in an estimated Rnn matrix may be based on a number of receiver components associated with the device performing the estimation (e.g., a UE 115 may include four receive antennas, eight receive antennas, or some other number of antennas for receiving data). For example, a UE 115 that includes eight receive antennas may estimate 64 elements in a Rnn matrix (e.g., an eight-by-eight Rnn matrix), and a UE 115 that includes four receive antennas may estimate 16 elements in a Rnn matrix (e.g., a four-by-four Rnn matrix). As such, performing the Rnn estimation may become more complex as the number of receive antennas increases (e.g., as the dimensionality increases).

Additionally or alternatively, the complexity of the Rnn estimation may be based on a number of transmitting devices. For example, base station 105-*a* may be in communication with UE 115-*a* and one or more other UEs 115 (e.g., base station 105-*a* may spatial division multiplex (SDM) multiple layers from multiple UEs 115). As the number of UEs 115 from which base station 105-*a* receives uplink data increases, the complexity of the Rnn estimation by base station 105-*a* may increase (e.g., the Rnn matrix may include more elements).

In some examples, the number of resources that are used for performing the Rnn estimation may remain the same as the dimensionality increases. A processing gain associated with the Rnn estimation may be based on the number of resources used for estimating the Rnn. If the processing gain remains the same as the complexity of the Rnn estimation increases, the accuracy and throughput of the Rnn estimation may decrease, which may result in decreased quality of communications via the data channel. Thus, there is motivation to increase the number of resources used for estimating the Rnn to improve the throughput and efficiency of Rnn estimation for devices with higher dimensionality.

To increase the number of resources for estimating Rnn, in some cases, one or more DMRS resources 210 may be replaced with null resources. The null resources may be empty resources that are not used for transmitting DMRSs. A device may measure noise and interference in the null resources. However, replacing DMRS resources 210 with null resources may limit the scheduling flexibility of the null resources, may negatively impact the channel spectral efficiency, or both. In some cases, a channel that includes more DMRS resources 210 may be associated with reduced throughput than a channel with fewer DMRS resources 210 (e.g., null DMRS resources, DMRS resources 210, or both).

As described herein, one or more null resources 215 may be introduced to improve Rnn estimation while maintaining spectral efficiency, increasing scheduling flexibility for the null resources, or both. The null resources 215 may be empty resources (e.g., the null resources 215 may not be used for data transmissions, DMRS transmissions, or any other transmissions) within a data channel that are different from the DMRS resources 210. Energy measured in the null resources 215 may be attributed to noise and interference.

The DMRS resources 210 may be configured according to a first configuration, and the null resources 215 may be configured according to a second configuration. The second configuration may indicate a time and frequency resource pattern for the null resources 215. To reduce the complexity associated with performing Rnn estimation, and to avoid negative impacts on the channel spectral efficiency and increase null resource scheduling flexibility, the null resources 215 may be different from the DMRS resources 210. For example, the null resources 215 may be configured in time periods (e.g., symbols) that are nonoverlapping with time periods for the DMRS resources 210. In some examples, the data resources 205 of the data channel may be rate matched around the time and frequency resource pattern for the null resources 215. Additionally or alternatively, the null resources 215 may puncture the data resources 205 based on the time and frequency resource pattern for the null resources 215.

UE 115-a may receive an indication of the first and second configurations for the DMRS resources 210 and the null resources 215 via RRC signaling, DCI, or both, from base station 105-a. In some examples, the network may configure a set of rules for determining the second configuration for the null resources 215. The first configuration may indicate the time and frequency pattern for the DMRS resources 210. The second configuration may indicate the time and frequency pattern for the null resources 215, and the second configuration may indicate whether the null resources 215 punctured the data resources 205, or whether the data resources 205 have been rate matched around the null resources 215.

In one example, base station 105-a may transmit an indication of the second configuration to UE 115-a, and the second configuration may indicate that the null resources 215 are to puncture the data resources 205 of the uplink data channel 220. UE 115-a may transmit uplink data to base station 105-a by puncturing one or more of the data resources 205 with the null resources 215 based on the second configuration. In another example, the second configuration may indicate to UE 115-a that the data resources 205 of the downlink data channel 225 have been punctured by the null resources 215. UE 115-a may receive the downlink data and perform the Rnn estimation of the downlink data channel 225 based on the second configuration.

In some examples, if the second configuration indicates that the data resources 205 have been rate matched around the null resources 215 in the downlink data channel 225, UE 115-a may perform a TBS calculation to estimate a TBS for the downlink data channel 225 based on the number of null resources 215 (e.g., the number of resources that have been rate matched). If the second configuration indicates that the data resources 205 have been rate matched around the null resources 215 in the uplink data channel 220, base station 105-a may perform a TBS calculation for the uplink data channel 220 based on the number of null resources 215.

In the example of the wireless communications system 200, the downlink data channel 225 and the uplink data channel 220 may include a number of resource elements 235. The resource elements 235 may be time and frequency resources that may be configured as data resources 205, DMRS resources 210, null resources 215, some other type of resources, or a combination thereof, as shown by channel resource configurations 230-a and 230-b. Channel resource configurations 230-a and 230-b may be based on the first configuration for DMRS resources 210 and the second configuration for null resources 215.

In one example, the null resources of the downlink data channel 225 may be configured in a third symbol of channel resource configuration 230-b, and the DMRS resources 210 may be configured in a first symbol of channel resource configuration 230-b. UE 115-a may receive an indication of first and second configurations that may indicate the DMRS resource pattern and the null resource pattern, respectively, of resource configuration 230-b. The resource patterns may indicate the location of the respective resources in the time domain (e.g., symbols that may include the resources) and the frequency domain (e.g., frequency tones within the respective symbols that may include the resources). Based on the configurations and indicated resource patterns, UE 115-a may receive and measure DMRSs via the DMRS resources 210, UE 115-a may measure received energy within the null resources 215, and UE 115-a may receive downlink data via the data resources 205. UE 115-a may perform a Rnn estimation based on the measured DMRSs and the measured received energy. For example, UE 115-a may estimate Rnn by averaging an estimate based on the measured DMRSs and an estimate based on the measured received energy. By averaging the estimates, UE 115-a may improve the efficiency and accuracy of the Rnn estimation. UE 115-a may demodulate the downlink data in the data resources 205 based on the Rnn estimation.

Although not illustrated in the example of FIG. 2, channel resource configurations 230-a and 230-b may include different time and frequency resource patterns for configuring the DMRS resources 210, the null resources 215, or both. For example, the null resources 215 of the uplink data channel 220 may be configured according to a different subcarrier spacing, a different symbol, a different period, a different offset in the time or frequency domain, or a combination thereof, than the null resources 215 of the downlink data channel 225. Additionally or alternatively, each downlink data channel 225 or each uplink data channel 220 of a set of channels may be associated with different configurations for the DMRS resources 210 and the null resources 215.

UE 115-a and base station 105-a may thereby utilize sets of null resources 215 located within the downlink data channel 225 and the uplink data channel 220, respectively, to perform Rnn estimations for the channels. By performing Rnn estimation based on the null resources 215, the devices may improve the processing gain and throughput associated with communications via the respective channels while maintaining channel spectral efficiency.

Figure 3:
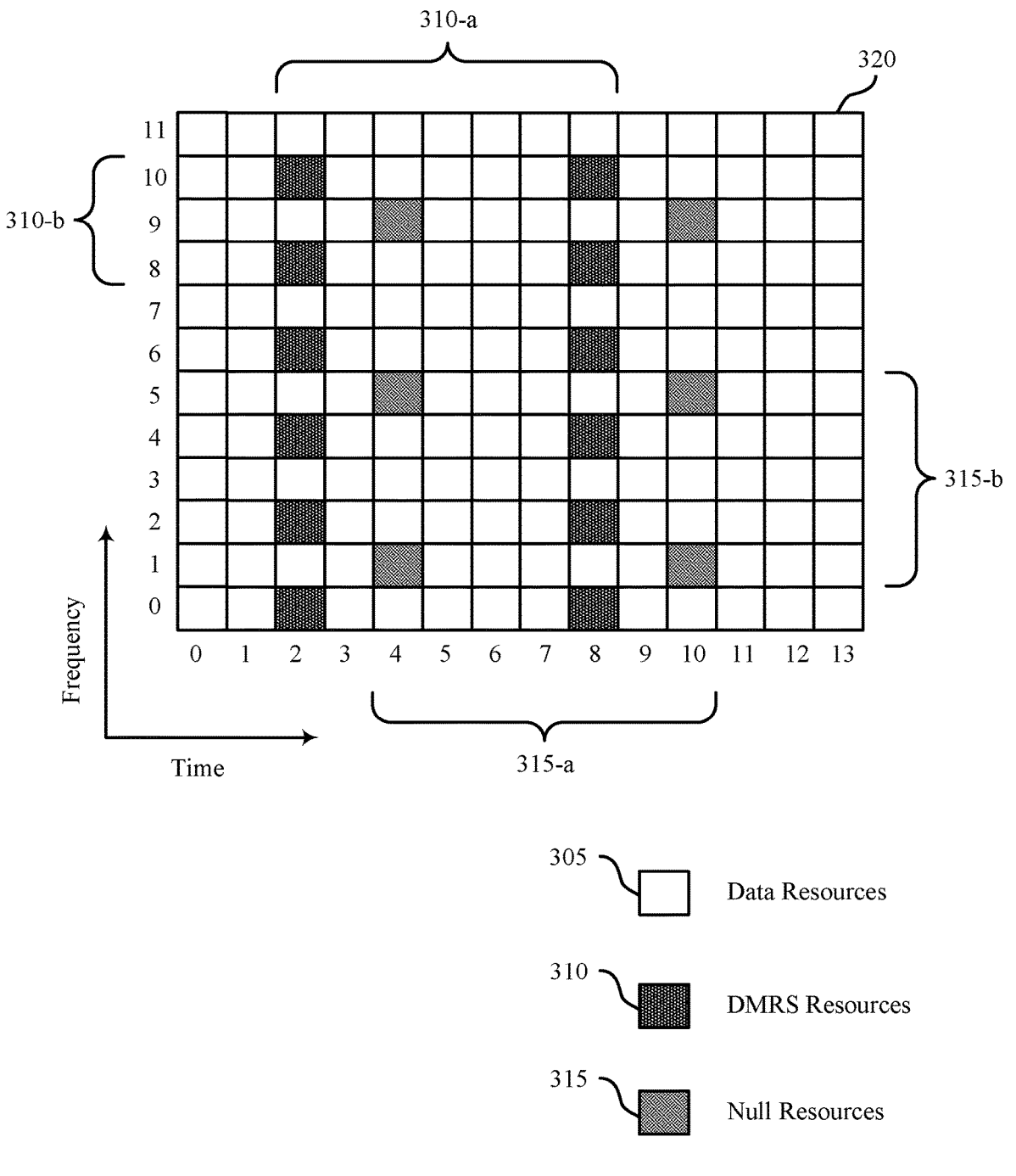
FIG. 3 illustrates an example of a time and frequency resource block that supports null resources configuration for channel estimation in accordance with aspects of the present disclosure.

FIG. 3 illustrates an example of a time and frequency resource block 300 that supports null resources configuration for channel estimation in accordance with aspects of the present disclosure. In some examples, the time and frequency resource block 300 may implement aspects of the wireless communications systems 100 and 200. The time and frequency resource block 300 illustrates an example of a time and frequency configuration of resources in a data channel (e.g., a PUSCH, a PDSCH, or some other type of channel). The time and frequency resource block 300 may include a set of resource elements 320. The resource elements 320 may denote time and frequency resources. Each resource element 320 may represent one symbol in the time domain (e.g., of symbols 0 through 13) and one subcarrier in the frequency domain (e.g., of subcarriers 0 through 11). The resource elements 320 may be configured as null resources 315, DMRS resources 310, data resources 305, other types of resources, or a combination thereof. In some cases, a UE 115, a base station 105, or some other device, may perform a Rnn estimation for the data channel based on received energy in the null resources 315, based on DMRSs received in the DMRS resources 310, or both, to improve the Rnn estimation.

The various types of resources may be distributed in the time and frequency domains based on one or more configurations. For example, a first resource configuration may indicate the location of the DMRS resources 310, and a second resource configuration may indicate the location of the null resources 315. The first resource configuration may indicate time domain DMRS resource pattern 310-$a$ and frequency domain DMRS resource pattern 310-$b$. The second resource configuration may indicate time domain null resource pattern 315-$a$ and frequency domain null resource pattern 315-$b$. A receiving device may receive an indication of the first and second resource configurations, and the device may identify the DMRS resources 310 and the null resources 315 accordingly.

The null resources 315 and the DMRS resources 310 may be located in different time periods (e.g., different symbols). For example, the null resources 315 may be offset from the DMRS resources 310 by a number of symbols, and may repeat according to the same symbol period or a different symbol period than the DMRS resources 310. In the example of the time and frequency resource block 300, time domain DMRS resource pattern 310-$a$ may indicate that the DMRS resources 310 are located in symbol 2 and symbol 8 of the time and frequency resource block 300 (e.g., a symbol period of six). Time domain null resource pattern 315-$a$ may be offset from time domain DMRS resource pattern 310-$a$ by two symbols, such that the null resources 315 may be located in symbols 4 and 10 (e.g., a symbol period of six).

In the frequency domain, the null resources 315 and the DMRS resources 310 may be located in the same subcarriers (e.g., frequency tones), different subcarriers, or both. The first and second resource configuration may indicate frequency domain DMRS resource pattern 310-$b$ and frequency domain null resource pattern 315-$b$, respectively. In some examples, frequency domain null resource pattern 315-$b$ may be configured based on frequency domain DMRS resource 310-$b$. For example, frequency domain DMRS resource pattern 310-$b$ may be configured according to a comb pattern of resource elements in the frequency domain and a comb offset relative to the data channel. In the time and frequency resource block 300, frequency domain DMRS resource pattern 310-$b$ may be configured with a comb level of two (e.g., every other comb) and a comb offset of zero relative to the first subcarrier of the time and frequency resource block 300. The comb level and the comb offset of frequency domain null resource pattern 315-$b$ may be configured based on frequency domain DMRS resource pattern 310-$b$. Thus, in one example (e.g., not pictured in FIG. 3), the null resources 315 may be located in the same subcarriers as the DMRS resources 310 (e.g., every other subcarrier).

In another example, to reduce overhead, frequency domain null resource pattern 315-$b$ may be configured according to a comb spacing relative to the data channel that may be more sparse than the comb spacing for the DMRS resources 310. For example, frequency domain null resource pattern 315-$b$ may be configured with a comb level of four and a comb offset of one subcarrier relative to the first subcarrier of the time and frequency resource block 300. The null resources 315 may be located in every fourth frequency tone (e.g., or every sixth frequency tone, every 12th frequency tone, or the like) within symbols 4 and 10 of the time and frequency resource block 300, which may result in less overhead than configuring the null resources 315 in every other subcarrier based on the DMRS resources 310. It is understood that resource elements 320 of a data channel may be configured according to other configurations that are not illustrated. For instance, the null resources 315 and the DMRS resources 310 may be configured according to any patterns, time periods, comb levels, comb spacings, and offsets in the time or frequency domains.

In a first example, the time and frequency resource patterns for the null resources 315 may be configured and the data resources 305 may be rate matched around the time and frequency resource patterns for the null resources 315. The null resources 315 may be scheduled as unavailable resources for transmitting data. For example, before the null resources 315 are configured, all of the resource elements 320 of the time and frequency resource block 300 may be scheduled as the DMRS resources 310 or the data resources 305. When the null resources 315 are configured and scheduled, a transmitting device may change a coding rate for the data to transmit the same amount of data via fewer data resources 305 to rate match around the null resources 315.

When the data resources 305 are rate matched around the null resources 315, a TBS for the data channel may be calculated or re-calculated based on a number of the null resources 315. For example, a TBS for a data channel that does not include the null resources 315 may be calculated based on a number of resource elements 320 that are allocated as data resources 305 within a physical resource block (PRB) of the data channel. The number of resource elements 320 per PRB, $N'_{RE}$, may be calculated based on a number of subcarriers in the channel, $N_{SC}^{RB}$, a number of symbols in each slot of the channel, $N_{symb}^{sh}$, a number of resource elements 320 reserved for DMRS transmissions (e.g., the DMRS resources 310), $N_{DMRS}^{PRB}$, and an overhead associated with the DMRSs, $N_{oh}^{PRB}$ (e.g., an overhead of DMRS code division multiplexed (CDM) groups without data). For example, the number of resource elements 320 per PRB may be calculated by the equation $N'_{RE}=N_{SC}^{RB}(N_{symb}^{sh})-N_{DMRS}^{PRB}-N_{oh}^{PRB}$. When the data resources 305 are rate matched around the null resources 315, the calculation for determining the number of resource elements 320 per PRB may be based on the number of null resources 315 (e.g., the number of rate matched resource elements 320). In one example, the TBS calculation may include the number of null resources 315, $N_{rateMatchingREs}$ (e.g., $N'_{RE}=N_{SC}^{RB}(N_{symb}^{sh})-N_{DMRS}^{PRB}-P_{oh}^{PRB}-N_{rateMatchingREs}$). In another example, the symbol $N_{DMRS}^{PRB}$ in the original TBS calculation may represent a summation of the number DMRS resources 310 and the number of null resources 315 per PRB.

The TBS calculation may further include selecting a quantized number of resource elements 320 that are allocated as data resources 305 from a table of quantized values based on which quantized value is closest to the calculated number of resource elements 320 per PRB. The total number of resource elements 320 that are allocated as data resources 305 may subsequently be determined by multiplying the quantized number of resource elements 320 per PRB by the number of PRBs allocated for the device within the data channel. The TBS size may then be calculated based on a number of information bits associated with the data resources 305 and selected from a TBS table. Thus, a device may perform such a TBS calculation to re-calculate the TBS for a data channel when the device receives an indication that the data resources 305 are to be rate matched around the null resources 315 in the data channel.

The indication that the data resources 305 are rate matched around the null resources 315 may be transmitted to a receiving device (e.g., a UE 115) via RRC signaling, via DCI, or both. The indication of the rate matching may include an indication of a rate matching pattern (e.g., a time and frequency pattern for the null resources 315). In one example, a receiving device may receive an indication that the data resources 305 are rate matched around the null resources 315 via RRC signaling (e.g., a semi-static indication). A set of null resource parameters may be configured and transmitted as part of the indication via RRC signaling (e.g., the null resource parameters may be transmitted via a data channel configuration field, such as PDSCH-Config or PUSCH-Config) to indicate a location of the null resources 315 (e.g., a symbol and a number of frequency tones within the symbol that may include the null resources 315). In another example, the receiving device may receive an indication of the rate matching via DCI (e.g., a dynamic indication). For example, an uplink or downlink scheduling DCI may include a bit field that may indicate a selected rate matching pattern from a set of configured patterns (e.g., an explicit indication of the rate matching pattern via the bit field in DCI). In some examples, the scheduling DCI may include an index to a row within a time domain resource allocation (TDRA) table (e.g., an implicit indication of the rate matching pattern via the index to the TDRA table). The TDRA table may include a rate matching column, which may include a set of rate matching patterns for the null resources 315. The scheduling DCI may thereby indicate that the data resources 305 are rate matched around the null resources 315 and may indicate a rate matching pattern by indexing to a row in the TDRA table.

In another example, the null resources 315 may puncture the data resources 305 based on the time and frequency resource patterns for the null resources 315. The data to be transmitted via the data channel may be scheduled across a number of the data resources 305 in the data channel and the null resources 315 may puncture a set of the scheduled data resources 305. If the null resources 315 puncture the data resources 305, one or more bits of the transmitted data may be lost due to the puncturing. The lost data may be recovered by adjusting the coding scheme for transmitting the data (e.g., lowering an MCS, reducing a coding rate, or the like). By puncturing the data resources 305, a device may transmit the data with the null resources 315 while refraining from rate matching and re-calculating a TBS.

The time and frequency location of the data resources 305 that are to be punctured may be specified by a network RRC configuration, defined in a standard (e.g., static), or both. The indication of the time and frequency location of the resources to be punctured may be an indication of an absolute time and frequency location of the resources in the scheduled data channel, or an indication of the time and frequency location of the resources relative to resources that have been assigned to the channel (e.g., relative to an actual transmission within the channel). If the time and frequency location of the data resources 305 that are to be punctured is defined in a standard, when puncturing occurs in the data channel, the location of the punctured resources may be fixed. If the time and frequency location of the data resources 305 that are to be punctured is indicated via RRC signaling, the location of the punctured resources may change (e.g., a semi-static or dynamic indication of the location of the punctured resources).

An indication that the data resources 305 are punctured by the null resources 315 may be transmitted to a UE 115 via scheduling DCI, may be based on a set of rules configured by the network, or a combination thereof. A UE 115 may receive the indication that puncturing occurs, and the UE 115 may determine the location of the punctured resources based on the RRC configuration or the standard.

In one example, the uplink or downlink scheduling DCI may include an indicator (e.g., a bit field) that indicates whether the scheduled data channel and the scheduled data resources 305 is punctured by the null resources 315. The indicator bit field in DCI may indicate whether puncturing is enabled on the data channel or disabled on the data channel (e.g., the bit field may indicate a '0' or '1'). If the UE 115 receives an indication that puncturing is enabled on the data channel, the UE 115 may assume that the data channel has been punctured (e.g., if the UE 115 receives downlink data via a PDSCH), or that the UE 115 is to puncture the data channel (e.g., if the UE 115 transmits uplink data via a PUSCH). If the UE 115 receives an indication that puncturing is disabled on the data channel, the UE 115 may not assume puncturing in a downlink data channel, or the UE 115 may refrain from puncturing data resources 305 in an uplink data channel.

In another example, the network may configure a set of rules for the UE 115 to determine whether puncturing is configured. For example, the network may configure the UE 115 to determine whether the null resources 315 punctured or are to puncture the data resources 305 based on a set of configured DCI parameters. The configured DCI parameters may include one or more radio network temporary identifiers (RNTIs), one or more DCI formats, one or more search space identifiers (IDs), one or more CORESET IDs, or a combination thereof. For example, a RNTI format, a DCI format, or both, may be configured to indicate puncturing, or if the UE 115 receives scheduling DCI via a search space or a CORESET with a configured ID, the UE 115 may assume that the scheduling DCI has puncturing enabled.

If the data channel is a downlink data channel (e.g., a PDSCH), a base station 105 may puncture a set of the data resources 305 that may be assigned to the PDSCH. A receiving UE 115 may receive an indication that the data resources 305 have been punctured by the null resources 315, and the UE 115 may measure Rnn in the punctured null resources 315 based on the indication and the scheduling downlink DCI. If the data channel is an uplink data channel (e.g., a PUSCH), a transmitting UE 115 may receive the indication that the data resources 305 are to be punctured by the null resources 315, and the UE 115 may puncture a set of the data resources 305 that are assigned to the PUSCH accordingly. The receiving base station 105 may decode the uplink data in the data resources 305 and measure Rnn in the null resources 315 based on the puncturing.

A UE 115 or a base station 105 may thereby receive a downlink data channel or an uplink data channel, respectively, with a set of null resources 315 configured in the data channel. The UE 115 or the base station 105 may perform Rnn estimation based on measuring the set of null resources 315 and the DMRS resources 310 to improve the accuracy of the Rnn estimation and to reduce complexity and latency associated with the estimation. In some examples, the data resources 305 may be rate matched around the null resources 315 and the UE 115 or the base station 105 may calculate a TB S for receiving data via the data channel. In other examples, the null resources may puncture the data resources 305. The UE 115 or the base station 105 may receive data via the data resources 305, and may demodulate the data based on the Rnn estimation to improve the data reception and demodulation performance.

FIG. 4 illustrates an example of a process flow 400 that supports null resources configuration for channel estimation in accordance with aspects of the present disclosure. In some examples, the process flow 400 may implement various aspects of the present disclosure as described with reference to FIGS. 1 through 3. The process flow 400 may include UE 115-*b* and base station 105-*b*, which may be examples of UEs 115 and base stations 105 as described with reference to FIGS. 1 and 2. In some examples, UE 115-*b* may perform a Rnn estimation of a downlink data channel based on a set of null resources included in the downlink data channel to improve the Rnn estimation.

It is understood that the devices or nodes described by the process flow 400 may communicate with or be coupled with other devices or nodes that are not illustrated. For instance, UE 115-*b* and base station 105-*b* may communicate with one or more other UEs 115, base stations 105, or other devices. Alternative examples of the following may be implemented, where some steps are performed in a different order than described or are not performed at all. In some cases, a step may include additional features not mentioned below, or further steps may be added At 405, in some examples, UE 115-*b* may receive an indication of first and second configurations for resources from base station 105-*b*. For example, base station 105-*b* may transmit an indication of the configurations via RRC signaling, via DCI, or some other control signaling.

At 410, UE 115-*b* may identify the first configuration for a set of DMRS resources in a first set of time periods of a downlink data channel (e.g., a PDSCH). UE 115-*b* may identify the configuration based on the indication received at 405. Additionally or alternatively, the first configuration may be configured by the network. The first configuration may indicate a time and frequency location of a set of DMRS resources in the downlink data channel, as described with reference to FIGS. 2 and 3.

At 415, UE 115-*b* may identify the second configuration for a set of null resources in a second set of time periods of the downlink data channel. UE 115-*b* may identify the second configuration based on the indication received at 405. Additionally or alternatively, the network may configure the second configuration at UE 115-*b*, or the network may configure a set of parameters for UE 115-*b* to determine the second configuration. The second configuration may indicate a time and frequency location of a set of null resources in the downlink data channel. In some examples, the second configuration may indicate whether the null resources punctured the downlink data resources of the downlink data channel or whether the downlink data resources have been rate matched around the null resources.

At 420, in some cases, base station 105-*b* may transmit downlink data to UE 115-*b*. Base station 105-*b* may transmit the downlink data via the downlink data channel based on the first and second configurations. Base station 105-*b* may puncture the downlink data resources with the null resources, rate match the downlink data resources around the null resources, or both, based on the second configuration.

At 425, UE 115-*b* may perform a channel estimation procedure on the downlink data channel based on the set of null resources and the set of DMRS resources. Performing the channel estimation procedure may include estimating a Rnn matrix for the downlink data channel. UE 115-*b* may measure an energy received via the null resources. UE 115-*b* may measure a set of DMRSs received via the DMRS resources. UE 115-*b* may calculate the Rnn estimate based on an average of the measured received energy and the measured DMRSs.

At 430, UE 115-*b* may process downlink data in the downlink data resources of the downlink data channel based on the channel estimation procedure. Processing the downlink data may include demodulating the downlink data. The demodulation process may be improved based on an accu-rate Rnn estimation. Thus, the demodulation process may be improved if UE 115-*b* estimates the Rnn based on the set of null resources in the downlink data channel.

Figure 5:
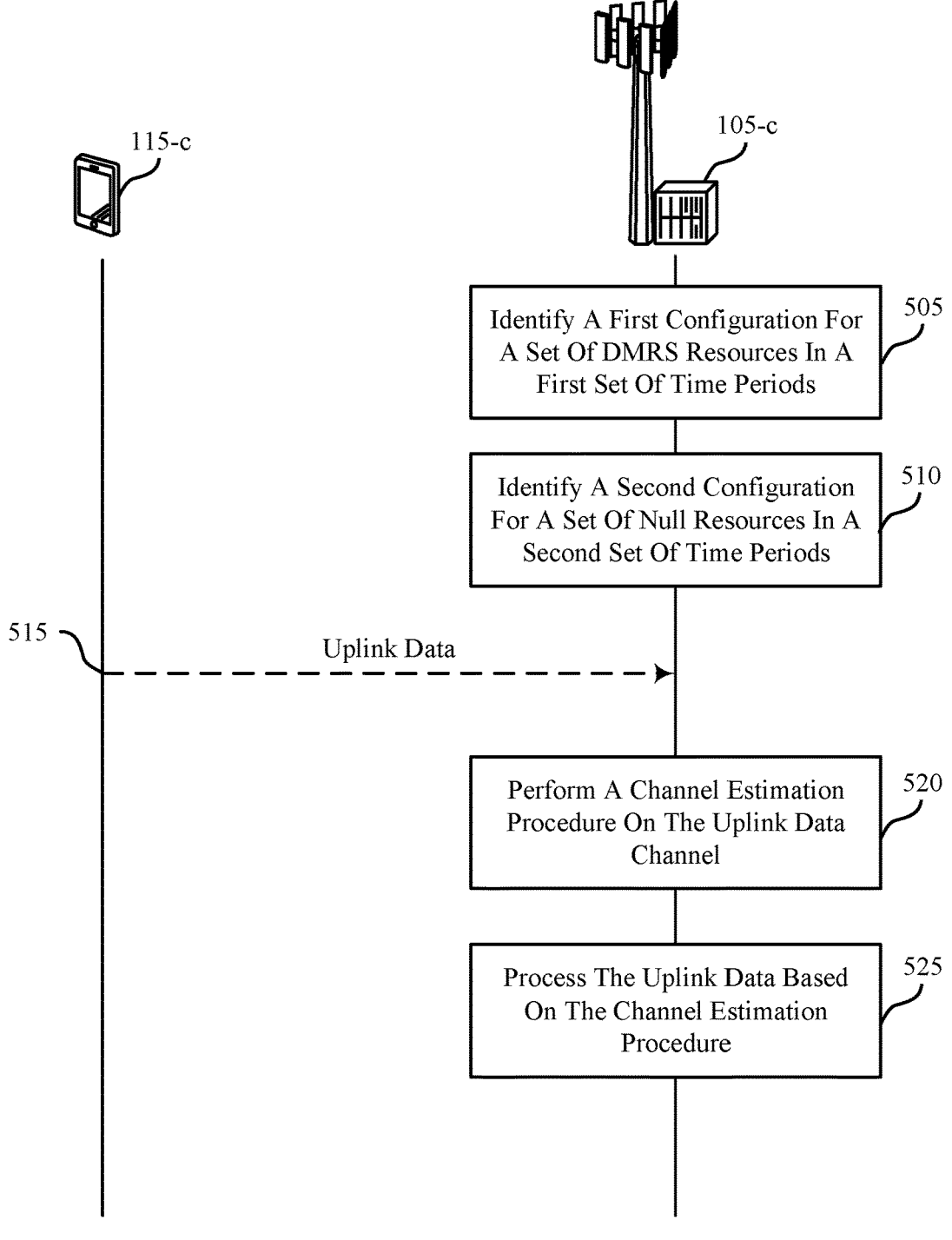

FIG. 5 illustrates an example of a process flow 500 that supports null resources configuration for channel estimation in accordance with aspects of the present disclosure. In some examples, the process flow 500 may implement various aspects of the present disclosure as described with reference to FIGS. 1 through 3. The process flow 500 may include UE 115-*c* and base station 105-*c*, which may be examples of UEs 115 and base stations 105 as described with reference to FIGS. 1 and 2. In some examples, base station 105-*c* may perform a Rnn estimation of an uplink data channel based on a set of null resources included in the uplink data channel to improve the Rnn estimation.

It is understood that the devices or nodes described by the process flow 500 may communicate with or be coupled with other devices or nodes that are not illustrated. For instance, UE 115-*c* and base station 105-*c* may communicate with one or more other UEs 115, base stations 105, or other devices. Alternative examples of the following may be implemented, where some steps are performed in a different order than described or are not performed at all. In some cases, a step may include additional features not mentioned below, or further steps may be added At 505, base station 105-*c* may identify a first configuration for a set of DMRS resources in a first set of time periods of an uplink data channel (e.g., a PUSCH). Base station 105-*c* may identify the configuration based on an indication or configuration by the network. The first configuration may indicate a time and frequency location of a set of DMRS resources in the uplink data channel, as described with reference to FIGS. 2 and 3.

At 510, base station 105-*c* may identify a second configuration for a set of null resources in a second set of time periods of the uplink data channel. Base station 105-*c* may identify the second configuration based on an indication or a configuration by the network. The second configuration may indicate a time and frequency location of the set of null resources in the uplink data channel. The second configuration may indicate whether the null resources puncture the uplink data resources of the uplink data channel or whether the uplink data resources have been rate matched around the null resources. In some examples, base station 105-*c* may transmit an indication of the second configuration to UE 115-*c* (e.g., via RRC signaling, via DCI, or both).

At 515, in some cases, UE 115-*c* may transmit uplink data to base station 105-*c*. In some examples, base station 105-*c* may transmit an indication of the first configuration, the second configuration, or both, to UE 115-*c*, and UE 115-*c* may transmit the uplink data via the uplink data channel based on the first and second configurations. UE 115-*c* may puncture the uplink data resources with the null resources, rate match the uplink data resources around the null resources, or both, based on the second configuration.

At 520, base station 105-*c* may perform a channel estimation procedure on the uplink data channel based on the set of null resources and the set of DMRS resources. Performing the channel estimation procedure may include estimating a Rnn matrix for the uplink data channel. Base station 105-*c* may measure an energy received via the null resources. Base station 105-*c* may measure DMRSs received via the DMRS resources. Base station 105-*c* may calculate the Rnn esti-mate based on an average of the measured received energy and the measured DMRSs.

At 525, base station 105-*c* may process uplink data in the uplink data resources of the uplink data channel based on the channel estimation procedure. Processing the uplink data may include demodulating the uplink data. The demodulation process may be improved based on an accurate Rnn estimation. Thus, the demodulation process may be improved if base station 105-c estimates the Rnn based on the set of null resources in the uplink data channel.

Figure 6:
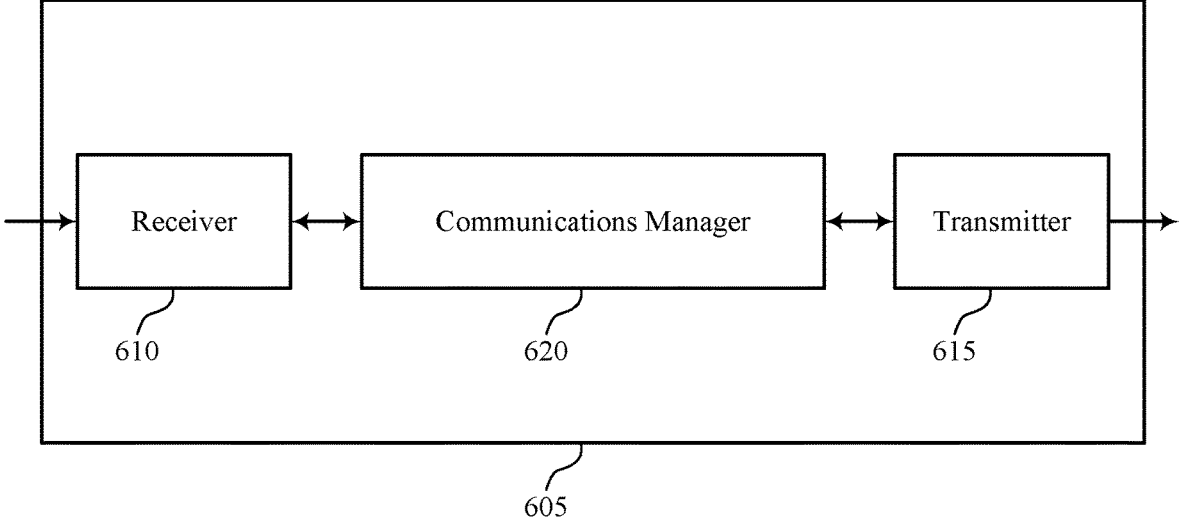
FIGS. 6 and 7 show block diagrams of devices that support null resources configuration for channel estimation in accordance with aspects of the present disclosure.

FIG. 6 shows a block diagram 600 of a device 605 that supports null resources configuration for channel estimation in accordance with aspects of the present disclosure. The device 605 may be an example of aspects of a UE 115 as described herein. The device 605 may include a receiver 610, a transmitter 615, and a communications manager 620. The device 605 may also include a processor. Each of these components may be in communication with one another (e.g., via one or more buses).

The receiver 610 may provide a means for receiving information such as packets, user data, control information, or any combination thereof associated with various information channels (e.g., control channels, data channels, information channels related to null resources configuration for channel estimation). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to null resources configuration for channel estimation). In some examples, the transmitter 615 may be co-located with a receiver 610 in a transceiver module. The transmitter 615 may utilize a single antenna or a set of multiple antennas.

The communications manager 620, the receiver 610, the transmitter 615, or various combinations thereof or various components thereof may be examples of means for performing various aspects of null resources configuration for channel estimation as described herein. For example, the communications manager 620, the receiver 610, the transmitter 615, or various combinations or components thereof may support a method for performing one or more of the functions described herein.

In some examples, the communications manager 620, the receiver 610, the transmitter 615, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 620, the receiver 610, the transmitter 615, or various combinations or components thereof may be implemented in code (e.g., as communications management software or firmware) executed by a processor. If implemented in code executed by a processor, the functions of the communications manager 620, the receiver 610, the transmitter 615, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 620 may be configured to perform various operations (e.g., receiving, monitoring, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to receive information, transmit information, or perform various other operations as described herein.

The communications manager 620 may support wireless communications by a UE in accordance with examples as disclosed herein. For example, the communications manager 620 may be configured as or otherwise support a means for identifying a first configuration for a set of DMRS resources in a first set of time periods of a downlink data channel and a second configuration for a set of null resources in a second set of time periods of the downlink data channel, where time periods of the first set of time periods are nonoverlapping with time periods of the second set of time periods. The communications manager 620 may be configured as or otherwise support a means for performing a channel estimation procedure on the downlink data channel based on the set of null resources and the set of DMRS resources. The communications manager 620 may be configured as or otherwise support a means for processing downlink data in downlink data resources of the downlink data channel based on the channel estimation procedure.

By including or configuring the communications manager 620 in accordance with examples as described herein, the device 605 (e.g., a processor controlling or otherwise coupled to the receiver 610, the transmitter 615, the communications manager 620, or a combination thereof) may support techniques for more efficient utilization of communication resources. For example, by measuring a received energy in a set of null resources, a processor of the device may refrain from configuring additional DMRS resources in a data channel. The processor of the device may thereby improve processing gain while maintaining channel spectral efficiency.

By performing Rnn estimation based on a set of null resources in a data channel, a processor of the device 605 may reduce processing complexity. For example, a number of Rnn matrix elements that may be estimated by the processor of the device 605 may be directly related to the number of receiver components of the device 605. As the number of receiver components increases, the complexity of the Rnn estimation may increase. Thus, by utilizing the set of null resources to estimate Rnn, the processor of the device 605 may increase the processing gain by increasing the number of resources that may be used to estimate Rnn as the Rnn estimation becomes more complex, thereby improving Rnn estimation accuracy and reducing processing complexity. Additionally or alternatively, by improving the Rnn estimation, the processor of the device 605 may reduce latency and improve accuracy of a demodulation procedure by the device 605. For example, the processor may demodulate received data based on the Rnn estimation, and an improved Rnn estimation may thereby improve the demodulation process and improve communications by the device 605.

Figure 7:
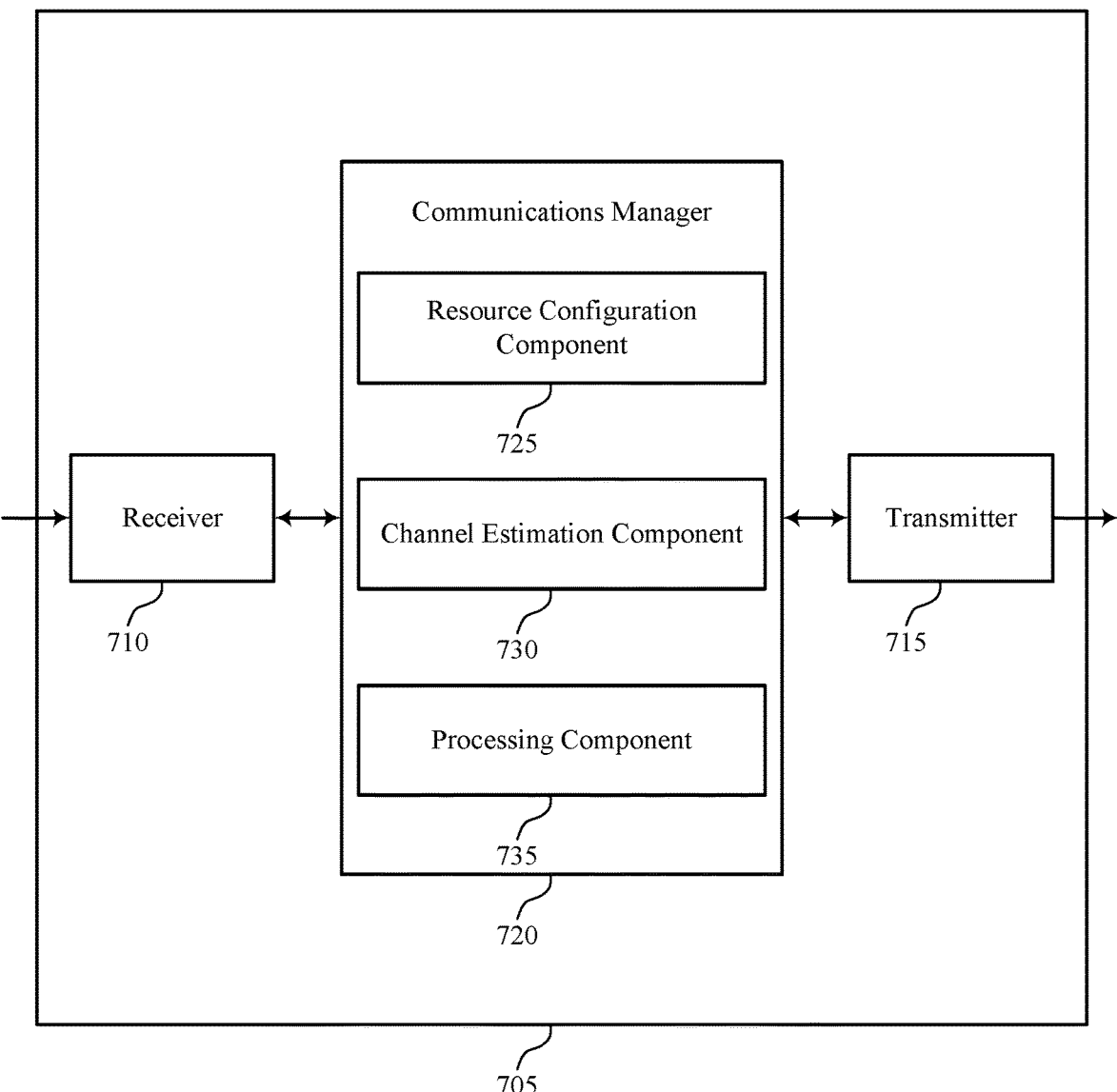

FIG. 7 shows a block diagram 700 of a device 705 that supports null resources configuration for channel estimation in accordance with aspects of the present disclosure. The device 705 may be an example of aspects of a device 605 or a UE 115 as described herein. The device 705 may include a receiver 710, a transmitter 715, and a communications manager 720. The device 705 may also include a processor. Each of these components may be in communication with one another (e.g., via one or more buses).

The receiver 710 may provide a means for receiving information such as packets, user data, control information, or any combination thereof associated with various information channels (e.g., control channels, data channels, information channels related to null resources configuration for channel estimation). Information may be passed on to other components of the device 705. The receiver 710 may utilize a single antenna or a set of multiple antennas.

The transmitter 715 may provide a means for transmitting signals generated by other components of the device 705. For example, the transmitter 715 may transmit information such as packets, user data, control information, or any combination thereof associated with various information channels (e.g., control channels, data channels, information channels related to null resources configuration for channel estimation). In some examples, the transmitter 715 may be co-located with a receiver 710 in a transceiver module. The transmitter 715 may utilize a single antenna or a set of multiple antennas.

The device 705, or various components thereof, may be an example of means for performing various aspects of null resources configuration for channel estimation as described herein. For example, the communications manager 720 may include a resource configuration component 725, a channel estimation component 730, a processing component 735, or any combination thereof. The communications manager 720 may be an example of aspects of a communications manager 620 as described herein. In some examples, the communications manager 720, or various components thereof, may be configured to perform various operations (e.g., receiving, monitoring, transmitting) using or otherwise in cooperation with the receiver 710, the transmitter 715, or both. For example, the communications manager 720 may receive information from the receiver 710, send information to the transmitter 715, or be integrated in combination with the receiver 710, the transmitter 715, or both to receive information, transmit information, or perform various other operations as described herein.

The communications manager 720 may support wireless communications by a UE in accordance with examples as disclosed herein. The resource configuration component 725 may be configured as or otherwise support a means for identifying a first configuration for a set of DMRS resources in a first set of time periods of a downlink data channel and a second configuration for a set of null resources in a second set of time periods of the downlink data channel, where time periods of the first set of time periods are nonoverlapping with time periods of the second set of time periods. The channel estimation component 730 may be configured as or otherwise support a means for performing a channel estimation procedure on the downlink data channel based on the set of null resources and the set of DMRS resources. The processing component 735 may be configured as or otherwise support a means for processing downlink data in downlink data resources of the downlink data channel based on the channel estimation procedure.

Figure 8:
FIG. 8 shows a block diagram of a communications manager that supports null resources configuration for channel estimation in accordance with aspects of the present disclosure.

FIG. 8 shows a block diagram 800 of a communications manager 820 that supports null resources configuration for channel estimation in accordance with aspects of the present disclosure. The communications manager 820 may be an example of aspects of a communications manager 620, a communications manager 720, or both, as described herein. The communications manager 820, or various components thereof, may be an example of means for performing various aspects of null resources configuration for channel estimation as described herein. For example, the communications manager 820 may include a resource configuration component 825, a channel estimation component 830, a processing component 835, a rate matching component 840, a puncturing component 845, a null resource component 850, a DMRS component 855, a TBS calculation component 860, a demodulation component 865, or any combination thereof. Each of these components may communicate, directly or indirectly, with one another (e.g., via one or more buses).

The communications manager 820 may support wireless communications by a UE in accordance with examples as disclosed herein. The resource configuration component 825 may be configured as or otherwise support a means for identifying a first configuration for a set of DMRS resources in a first set of time periods of a downlink data channel and a second configuration for a set of null resources in a second set of time periods of the downlink data channel, where time periods of the first set of time periods are nonoverlapping with time periods of the second set of time periods. The channel estimation component 830 may be configured as or otherwise support a means for performing a channel estimation procedure on the downlink data channel based on the set of null resources and the set of DMRS resources. The processing component 835 may be configured as or otherwise support a means for processing downlink data in downlink data resources of the downlink data channel based on the channel estimation procedure.

In some examples, the rate matching component 840 may be configured as or otherwise support a means for identifying a time and frequency resource pattern for the set of null resources, where the second configuration indicates rate matching of the downlink data resources around the time and frequency resource pattern for the set of null resources.

In some examples, the time and frequency resource pattern for the set of null resources is based on a time and frequency resource pattern for the set of DMRS resources. In some examples, the time and frequency resource pattern for the set of null resources is based on a comb pattern of resource elements defined with respect to the downlink data channel.

In some examples, identifying the second configuration includes receiving RRC signaling indicating the second configuration.

In some examples, identifying the second configuration includes receiving DCI indicating the second configuration. In some examples, the DCI includes an index to an indication of the time and frequency resource pattern for the set of null resources in a TDRA table.

In some examples, the TBS calculation component 860 may be configured as or otherwise support a means for calculating a transport block size for the downlink data channel based on a number of resource elements associated with the set of null resources.

In some examples, the puncturing component 845 may be configured as or otherwise support a means for identifying a time and frequency resource pattern for the set of null resources, where the second configuration indicates puncturing of the downlink data resources with the set of null resources.

In some examples, the puncturing component 845 may be configured as or otherwise support a means for receiving DCI indicating the second configuration. In some examples, the DCI includes an indication that puncturing is enabled for the downlink data channel. In some examples, the DCI includes an indication that puncturing is disabled for the downlink data channel.

In some examples, the UE is configured to determine whether the set of null resources punctured the downlink data resources based on a set of DCI parameters configured by a network. In some examples, the set of DCI parameters includes one or more RNTIs, one or more DCI formats, one or more search space IDs, one or more CORESET IDs, or a combination thereof.

In some examples, the null resource component 850 may be configured as or otherwise support a means for determining that the set of null resources are unavailable resources for the downlink data resources.

In some examples, to support performing the channel estimation procedure on the downlink data channel, the null resource component 850 may be configured as or otherwise support a means for measuring received energy within the set of null resources. In some examples, to support performing the channel estimation procedure on the downlink data channel, the DMRS component 855 may be configured as or otherwise support a means for measuring reference signals within the set of DMRS resources. In some examples, to support performing the channel estimation procedure on the downlink data channel, the channel estimation component 830 may be configured as or otherwise support a means for calculating a noise and interference estimate for the downlink data channel based on the measured received energy and the measured reference signals.

In some examples, the noise and interference estimate includes a channel noise and interference covariance matrix. In some examples, the demodulation component 865 may be configured as or otherwise support a means for demodulating the downlink data based on the channel noise and interference covariance matrix.

In some examples, the UE includes a set of multiple receiver components.

Figure 9:
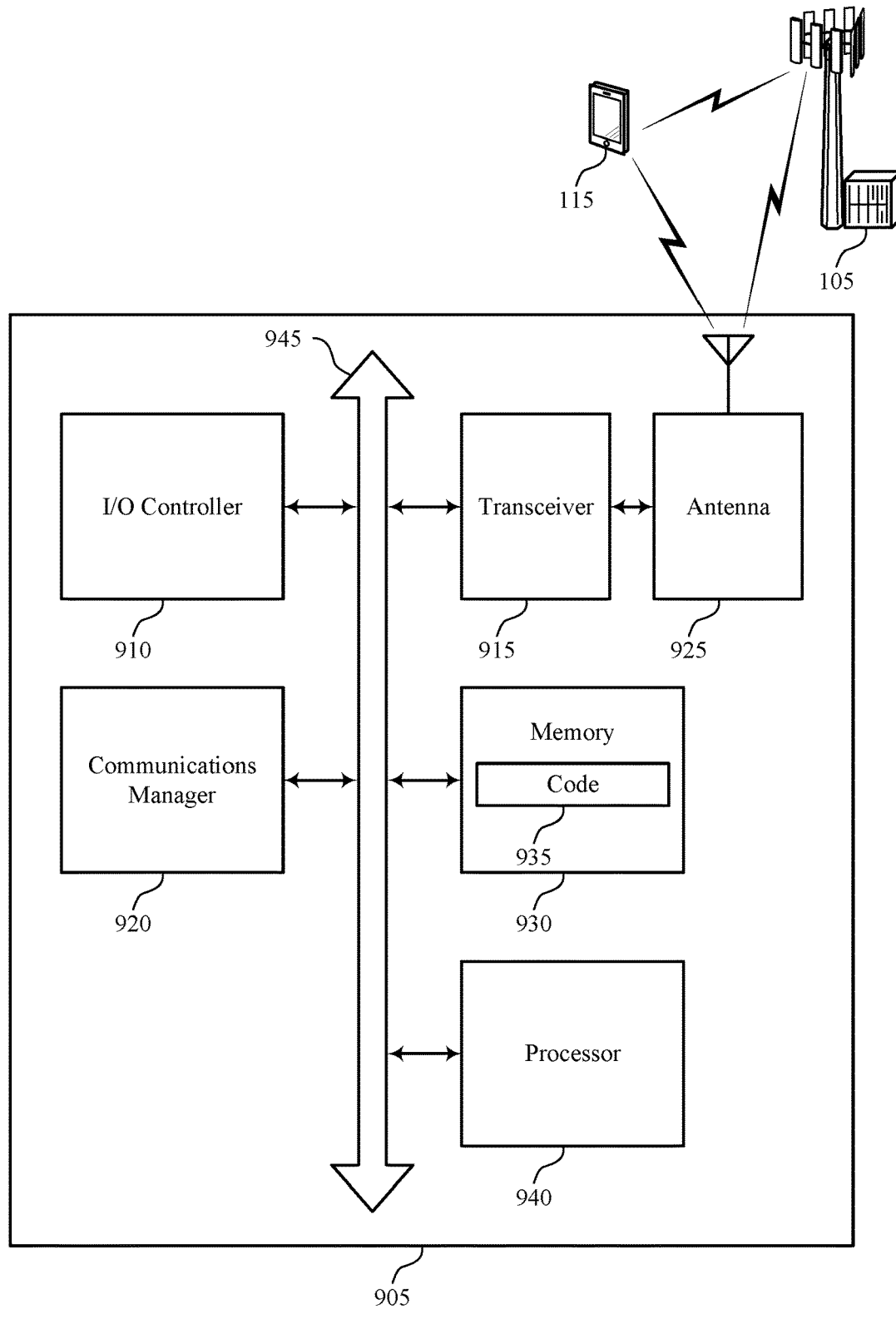
FIG. 9 shows a diagram of a system including a device that supports null resources configuration for channel estimation in accordance with aspects of the present disclosure.

FIG. 9 shows a diagram of a system 900 including a device 905 that supports null resources configuration for channel estimation in accordance with aspects of the present disclosure. The device 905 may be an example of or include the components of a device 605, a device 705, or a UE 115 as described herein. The device 905 may communicate wirelessly with one or more base stations 105, UEs 115, or any combination thereof. The device 905 may include components for bi-directional voice and data communications including components for transmitting and receiving communications, such as a communications manager 920, an input/output (I/O) controller 910, a transceiver 915, an antenna 925, a memory 930, code 935, and a processor 940. These components may be in electronic communication or otherwise coupled (e.g., operatively, communicatively, functionally, electronically, electrically) via one or more buses (e.g., a bus 945).

The I/O controller 910 may manage input and output signals for the device 905. The I/O controller 910 may also manage peripherals not integrated into the device 905. In some cases, the I/O controller 910 may represent a physical connection or port to an external peripheral. In some cases, the I/O controller 910 may utilize an operating system such as iOS®, ANDROID®, MS-DOS®, MS-WINDOWS®, OS/2®, UNIX®, LINUX®, or another known operating system. Additionally or alternatively, the I/O controller 910 may represent or interact with a modem, a keyboard, a mouse, a touchscreen, or a similar device. In some cases, the I/O controller 910 may be implemented as part of a processor, such as the processor 940. In some cases, a user may interact with the device 905 via the I/O controller 910 or via hardware components controlled by the I/O controller 910.

In some cases, the device 905 may include a single antenna 925. However, in some other cases, the device 905 may have more than one antenna 925, which may be capable of concurrently transmitting or receiving multiple wireless transmissions. The transceiver 915 may communicate bi-directionally, via the one or more antennas 925, wired, or wireless links as described herein. For example, the transceiver 915 may represent a wireless transceiver and may communicate bi-directionally with another wireless transceiver. The transceiver 915 may also include a modem to modulate the packets, to provide the modulated packets to one or more antennas 925 for transmission, and to demodulate packets received from the one or more antennas 925. The transceiver 915, or the transceiver 915 and one or more antennas 925, may be an example of a transmitter 615, a transmitter 715, a receiver 610, a receiver 710, or any combination thereof or component thereof, as described herein.

The memory 930 may include random access memory (RAM) and read-only memory (ROM). The memory 930 may store computer-readable, computer-executable code 935 including instructions that, when executed by the processor 940, cause the device 905 to perform various functions described herein. The code 935 may be stored in a non-transitory computer-readable medium such as system memory or another type of memory. In some cases, the code 935 may not be directly executable by the processor 940 but may cause a computer (e.g., when compiled and executed) to perform functions described herein. In some cases, the memory 930 may contain, among other things, a basic I/O system (BIOS) which may control basic hardware or software operation such as the interaction with peripheral components or devices.

The processor 940 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 940 may be configured to operate a memory array using a memory controller. In some other cases, a memory controller may be integrated into the processor 940. The processor 940 may be configured to execute computer-readable instructions stored in a memory (e.g., the memory 930) to cause the device 905 to perform various functions (e.g., functions or tasks supporting null resources configuration for channel estimation). For example, the device 905 or a component of the device 905 may include a processor 940 and memory 930 coupled to the processor 940, the processor 940 and memory 930 configured to perform various functions described herein.

The communications manager 920 may support wireless communications by a UE in accordance with examples as disclosed herein. For example, the communications manager 920 may be configured as or otherwise support a means for identifying a first configuration for a set of DMRS resources in a first set of time periods of a downlink data channel and a second configuration for a set of null resources in a second set of time periods of the downlink data channel, where time periods of the first set of time periods are nonoverlapping with time periods of the second set of time periods. The communications manager 920 may be configured as or otherwise support a means for performing a channel estimation procedure on the downlink data channel based on the set of null resources and the set of DMRS resources. The communications manager 920 may be configured as or otherwise support a means for processing downlink data in downlink data resources of the downlink data channel based on the channel estimation procedure.

By including or configuring the communications manager 920 in accordance with examples as described herein, the device 905 (e.g., a UE 115) may support techniques for improved communication reliability and improved utilization of processing capability. For example, the device 905 may perform a channel estimation based on measuring energy received via a set of null resources, measuring DMRSs, or both. By performing the channel estimation based on the set of null resources and the set of DMRSs, the device 905 may allow for improved processing gain and a more accurate Rnn estimation.

In some examples, a number of receiver components of the device 905 may be high (e.g., high dimensionality of the device 905), which may result in a large number of elements to be estimated in the Rnn matrix. By measuring the set of null resources to perform the Rnn estimation, the device 905 may increase the processing gain for the Rnn estimation. As the processing gain increases, the quality of the Rnn estimation by the device 905 may improve, which may allow for improved demodulation of data by the device 905. The device 905 may thereby receive and demodulate data more efficiently and accurately by estimating Rnn based on a set of null resources without negatively impacting the channel spectral efficiency or channel throughput.

In some examples, the communications manager 920 may be configured to perform various operations (e.g., receiving, monitoring, transmitting) using or otherwise in cooperation with the transceiver 915, the one or more antennas 925, or any combination thereof. Although the communications manager 920 is illustrated as a separate component, in some examples, one or more functions described with reference to the communications manager 920 may be supported by or performed by the processor 940, the memory 930, the code 935, or any combination thereof. For example, the code 935 may include instructions executable by the processor 940 to cause the device 905 to perform various aspects of null resources configuration for channel estimation as described herein, or the processor 940 and the memory 930 may be otherwise configured to perform or support such operations.

Figure 10:
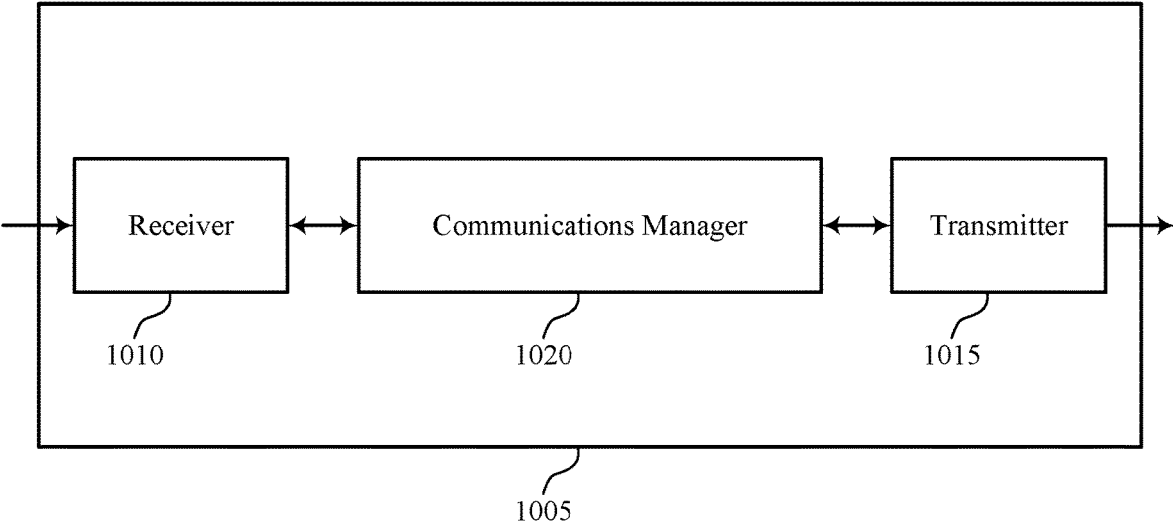
FIGS. 10 and 11 show block diagrams of devices that support null resources configuration for channel estimation in accordance with aspects of the present disclosure.

FIG. 10 shows a block diagram 1000 of a device 1005 that supports null resources configuration for channel estimation in accordance with aspects of the present disclosure. The device 1005 may be an example of aspects of a base station 105 as described herein. The device 1005 may include a receiver 1010, a transmitter 1015, and a communications manager 1020. The device 1005 may also include a processor. Each of these components may be in communication with one another (e.g., via one or more buses).

The receiver 1010 may provide a means for receiving information such as packets, user data, control information, or any combination thereof associated with various information channels (e.g., control channels, data channels, information channels related to null resources configuration for channel estimation). Information may be passed on to other components of the device 1005. The receiver 1010 may utilize a single antenna or a set of multiple antennas.

The transmitter 1015 may provide a means for transmitting signals generated by other components of the device 1005. For example, the transmitter 1015 may transmit information such as packets, user data, control information, or any combination thereof associated with various information channels (e.g., control channels, data channels, information channels related to null resources configuration for channel estimation). In some examples, the transmitter 1015 may be co-located with a receiver 1010 in a transceiver module. The transmitter 1015 may utilize a single antenna or a set of multiple antennas.

The communications manager 1020, the receiver 1010, the transmitter 1015, or various combinations thereof or various components thereof may be examples of means for performing various aspects of null resources configuration for channel estimation as described herein. For example, the communications manager 1020, the receiver 1010, the transmitter 1015, or various combinations or components thereof may support a method for performing one or more of the functions described herein.

In some examples, the communications manager 1020, the receiver 1010, the transmitter 1015, or various combinations or components thereof may be implemented in hardware (e.g., in communications management circuitry). The hardware may include a processor, a DSP, an ASIC, an FPGA or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 1020, the receiver 1010, the transmitter 1015, or various combinations or components thereof may be implemented in code (e.g., as communications management software or firmware) executed by a processor. If implemented in code executed by a processor, the functions of the communications manager 1020, the receiver 1010, the transmitter 1015, or various combinations or components thereof may be performed by a general-purpose processor, a DSP, a CPU, an ASIC, an FPGA, or any combination of these or other programmable logic devices (e.g., configured as or otherwise supporting a means for performing the functions described in the present disclosure).

In some examples, the communications manager 1020 may be configured to perform various operations (e.g., receiving, monitoring, transmitting) using or otherwise in cooperation with the receiver 1010, the transmitter 1015, or both. For example, the communications manager 1020 may receive information from the receiver 1010, send information to the transmitter 1015, or be integrated in combination with the receiver 1010, the transmitter 1015, or both to receive information, transmit information, or perform various other operations as described herein.

The communications manager 1020 may support wireless communications by a base station in accordance with examples as disclosed herein. For example, the communications manager 1020 may be configured as or otherwise support a means for identifying a first configuration for a set of DMRS resources in a first set of time periods of an uplink data channel and a second configuration for a set of null resources in a second set of time periods of the uplink data channel, where time periods of the first set of time periods are nonoverlapping with time periods of the second set of time periods. The communications manager 1020 may be configured as or otherwise support a means for performing a channel estimation procedure on the uplink data channel based on the set of null resources and the set of DMRS resources. The communications manager 1020 may be configured as or otherwise support a means for processing uplink data in uplink data resources of the uplink data channel based on the channel estimation procedure.

By including or configuring the communications manager 1020 in accordance with examples as described herein, the device 1005 (e.g., a processor controlling or otherwise coupled to the receiver 1010, the transmitter 1015, the communications manager 1020, or a combination thereof) may support techniques for more efficient utilization of communication resources. For example, by measuring a received energy in a set of null resources, a processor of the device 1005 may refrain from measuring more than a configured set of DMRS resources. The processor may thereby improve processing gain while refraining from reducing channel spectral efficiency by adding more DMRS resources to the channel.

Additionally or alternatively, by performing Rnn estimation based on a set of null resources in a data channel, a processor of the device 1005 may reduce processing complexity. For example, a number of Rnn matrix elements that may be estimated by the processor may be directly related to the number of receiver components of the device 1005. As the number of receiver components increases, the complexity of the Rnn estimation may increase. Thus, by utilizing the set of null resources to estimate Rnn, the processor may increase the processing gain as the Rnn estimation becomes more complex, thereby improving Rnn estimation accuracy and reducing processing complexity.

Figure 11:
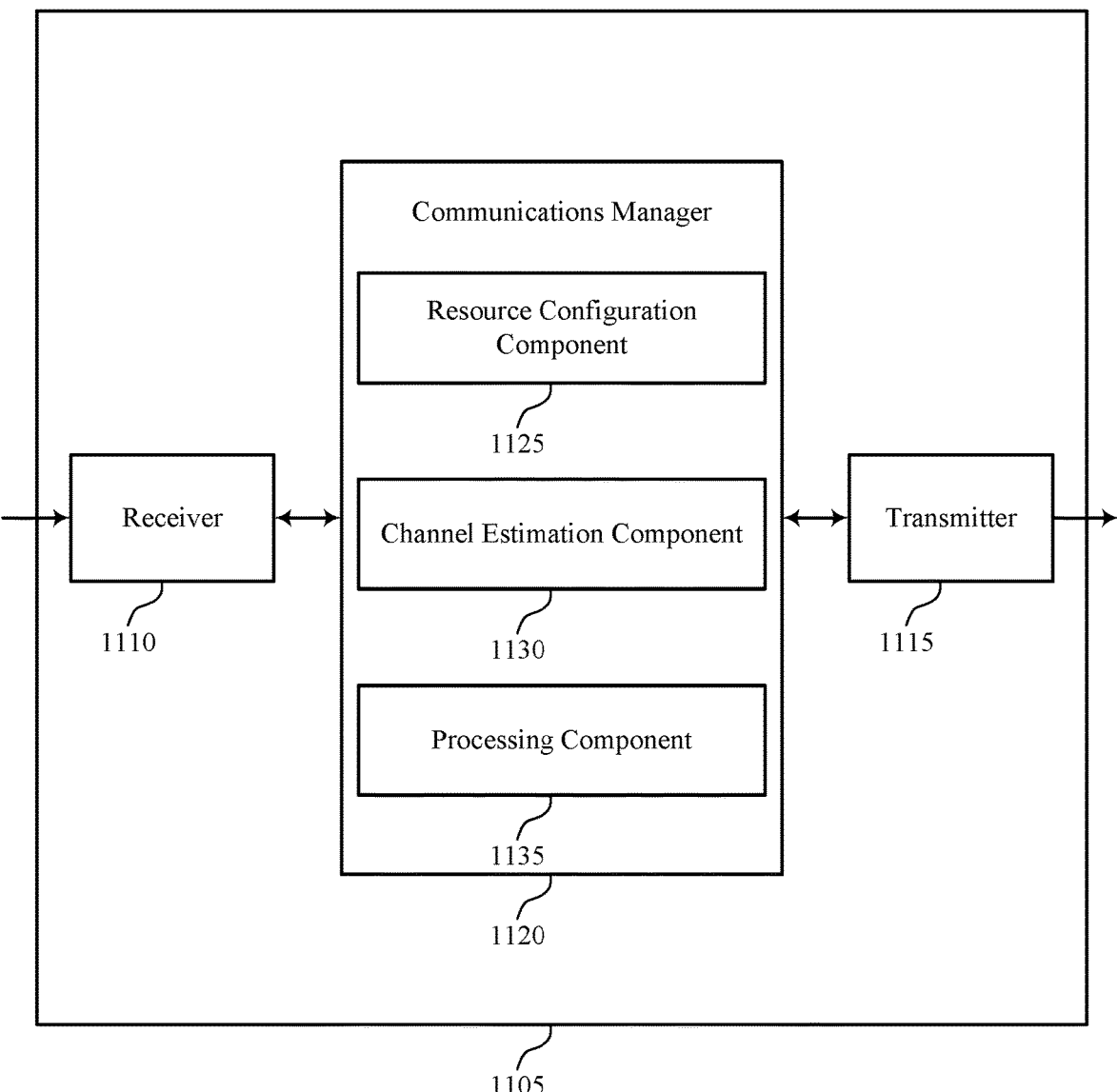

FIG. 11 shows a block diagram 1100 of a device 1105 that supports null resources configuration for channel estimation in accordance with aspects of the present disclosure. The device 1105 may be an example of aspects of a device 1005 or a base station 105 as described herein. The device 1105 may include a receiver 1110, a transmitter 1115, and a communications manager 1120. The device 1105 may also include a processor. Each of these components may be in communication with one another (e.g., via one or more buses).

The receiver 1110 may provide a means for receiving information such as packets, user data, control information, or any combination thereof associated with various information channels (e.g., control channels, data channels, information channels related to null resources configuration for channel estimation). Information may be passed on to other components of the device 1105. The receiver 1110 may utilize a single antenna or a set of multiple antennas.

The transmitter 1115 may provide a means for transmitting signals generated by other components of the device 1105. For example, the transmitter 1115 may transmit information such as packets, user data, control information, or any combination thereof associated with various information channels (e.g., control channels, data channels, information channels related to null resources configuration for channel estimation). In some examples, the transmitter 1115 may be co-located with a receiver 1110 in a transceiver module. The transmitter 1115 may utilize a single antenna or a set of multiple antennas.

The device 1105, or various components thereof, may be an example of means for performing various aspects of null resources configuration for channel estimation as described herein. For example, the communications manager 1120 may include a resource configuration component 1125, a channel estimation component 1130, processing component 1135, or any combination thereof. The communications manager 1120 may be an example of aspects of a communications manager 1020 as described herein. In some examples, the communications manager 1120, or various components thereof, may be configured to perform various operations (e.g., receiving, monitoring, transmitting) using or otherwise in cooperation with the receiver 1110, the transmitter 1115, or both. For example, the communications manager 1120 may receive information from the receiver 1110, send information to the transmitter 1115, or be integrated in combination with the receiver 1110, the transmitter 1115, or both to receive information, transmit information, or perform various other operations as described herein.

The communications manager 1120 may support wireless communications by a base station in accordance with examples as disclosed herein. The resource configuration component 1125 may be configured as or otherwise support a means for identifying a first configuration for a set of DMRS resources in a first set of time periods of an uplink data channel and a second configuration for a set of null resources in a second set of time periods of the uplink data channel, where time periods of the first set of time periods are nonoverlapping with time periods of the second set of time periods. The channel estimation component 1130 may be configured as or otherwise support a means for performing a channel estimation procedure on the uplink data channel based on the set of null resources and the set of DMRS resources. The processing component 1135 may be configured as or otherwise support a means for processing uplink data in uplink data resources of the uplink data channel based on the channel estimation procedure.

Figure 12:
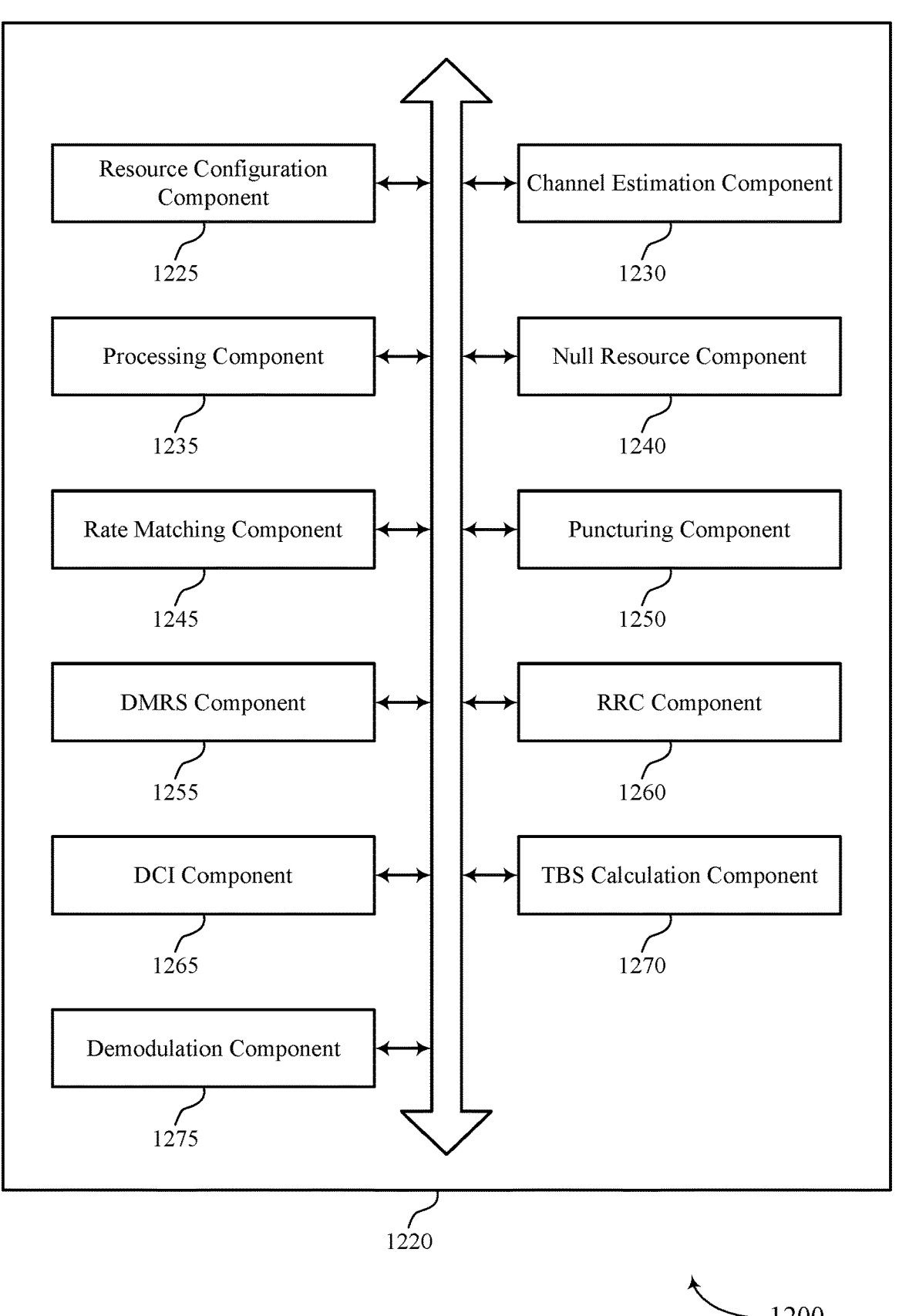
FIG. 12 shows a block diagram of a communications manager that supports null resources configuration for channel estimation in accordance with aspects of the present disclosure.

FIG. 12 shows a block diagram 1200 of a communications manager 1220 that supports null resources configuration for channel estimation in accordance with aspects of the present disclosure. The communications manager 1220 may be an example of aspects of a communications manager 1020, a communications manager 1120, or both, as described herein. The communications manager 1220, or various components thereof, may be an example of means for performing various aspects of null resources configuration for channel estimation as described herein. For example, the communications manager 1220 may include a resource configuration component 1225, a channel estimation component 1230, a processing component 1235, a null resource component 1240, a rate matching component 1245, a puncturing component 1250, a DMRS component 1255, an RRC component 1260, a DCI component 1265, a TBS calculation component 1270, a demodulation component 1275, or any combination thereof. Each of these components may communicate, directly or indirectly, with one another (e.g., via one or more buses).

The communications manager 1220 may support wireless communications by a base station in accordance with examples as disclosed herein. The resource configuration component 1225 may be configured as or otherwise support a means for identifying a first configuration for a set of DMRS resources in a first set of time periods of an uplink data channel and a second configuration for a set of null resources in a second set of time periods of the uplink data channel, where time periods of the first set of time periods are nonoverlapping with time periods of the second set of time periods. The channel estimation component 1230 may be configured as or otherwise support a means for performing a channel estimation procedure on the uplink data channel based on the set of null resources and the set of DMRS resources. The processing component 1235 may be configured as or otherwise support a means for processing uplink data in uplink data resources of the uplink data channel based on the channel estimation procedure.

In some examples, the null resource component 1240 may be configured as or otherwise support a means for identifying a time and frequency resource pattern for the set of null resources. In some examples, the rate matching component 1245 may be configured as or otherwise support a means for transmitting, to a UE, an indication of the second configuration, where the second configuration indicates rate matching of the uplink data resources around the time and frequency resource pattern for the set of null resources.

In some examples, the time and frequency resource pattern for the set of null resources is based on a time and frequency resource pattern for the set of DMRS resources. In some examples, the time and frequency resource pattern for the set of null resources is based on a comb pattern of resource elements defined with respect to the uplink data channel.

In some examples, the RRC component 1260 may be configured as or otherwise support a means for transmitting the indication of the second configuration via RRC information signaling.

In some examples, the DCI component 1265 may be configured as or otherwise support a means for transmitting the indication of the second configuration via DCI. In some examples, the DCI includes an index to an indication of the time and frequency resource pattern for the set of null resources in a TDRA table. In some examples, the DCI includes a bit field indication the second configuration.

In some examples, the TBS calculation component 1270 may be configured as or otherwise support a means for calculating a TBS for the uplink data channel based on a number of resource elements associated with the set of null resources.

In some examples, the null resource component 1240 may be configured as or otherwise support a means for identifying a time and frequency resource pattern for the set of null resources. In some examples, the puncturing component 1250 may be configured as or otherwise support a means for transmitting, to a UE, an indication of the second configuration, where the second configuration indicates puncturing of the uplink data resources with the set of null resources.

In some examples, the DCI component 1265 may be configured as or otherwise support a means for transmitting the indication of the second configuration via DCI. In some examples, the DCI includes an indication that puncturing is enabled for the uplink data channel. In some examples, the DCI includes an indication that puncturing is disabled for the uplink data channel.

In some examples, the puncturing component 1250 may be configured as or otherwise support a means for determining whether the set of null resources puncture the uplink data resources based on a set of parameters configured by a network. In some examples, the DCI component 1265 may be configured as or otherwise support a means for transmitting DCI based on the set of parameters. In some examples, the set of parameters includes one or more RNTIs, one or more DCI formats, one or more search space IDs, one or more CORESET IDs, or a combination thereof.

In some examples, the null resource component 1240 may be configured as or otherwise support a means for determining that the set of null resources are unavailable resources for the uplink data resources.

In some examples, to support performing the channel estimation procedure on the uplink data channel, the null resource component 1240 may be configured as or otherwise support a means for measuring received energy within the set of null resources. In some examples, to support performing the channel estimation procedure on the uplink data channel, the DMRS component 1255 may be configured as or otherwise support a means for measuring reference signals within the set of DMRS resources. In some examples, to support performing the channel estimation procedure on the uplink data channel, the channel estimation component 1230 may be configured as or otherwise support a means for calculating a noise and interference estimate for the uplink data channel based on the measured received energy and the measured reference signals.

In some examples, the noise and interference estimate includes a channel noise and interference covariance matrix. In some examples, the demodulation component 1275 may be configured as or otherwise support a means for demodulating the uplink data based on the channel noise and interference covariance matrix.

In some examples, the base station receives the uplink data from a set of multiple UEs.

In some examples, the base station includes a set of multiple receiver components.

Figure 13:
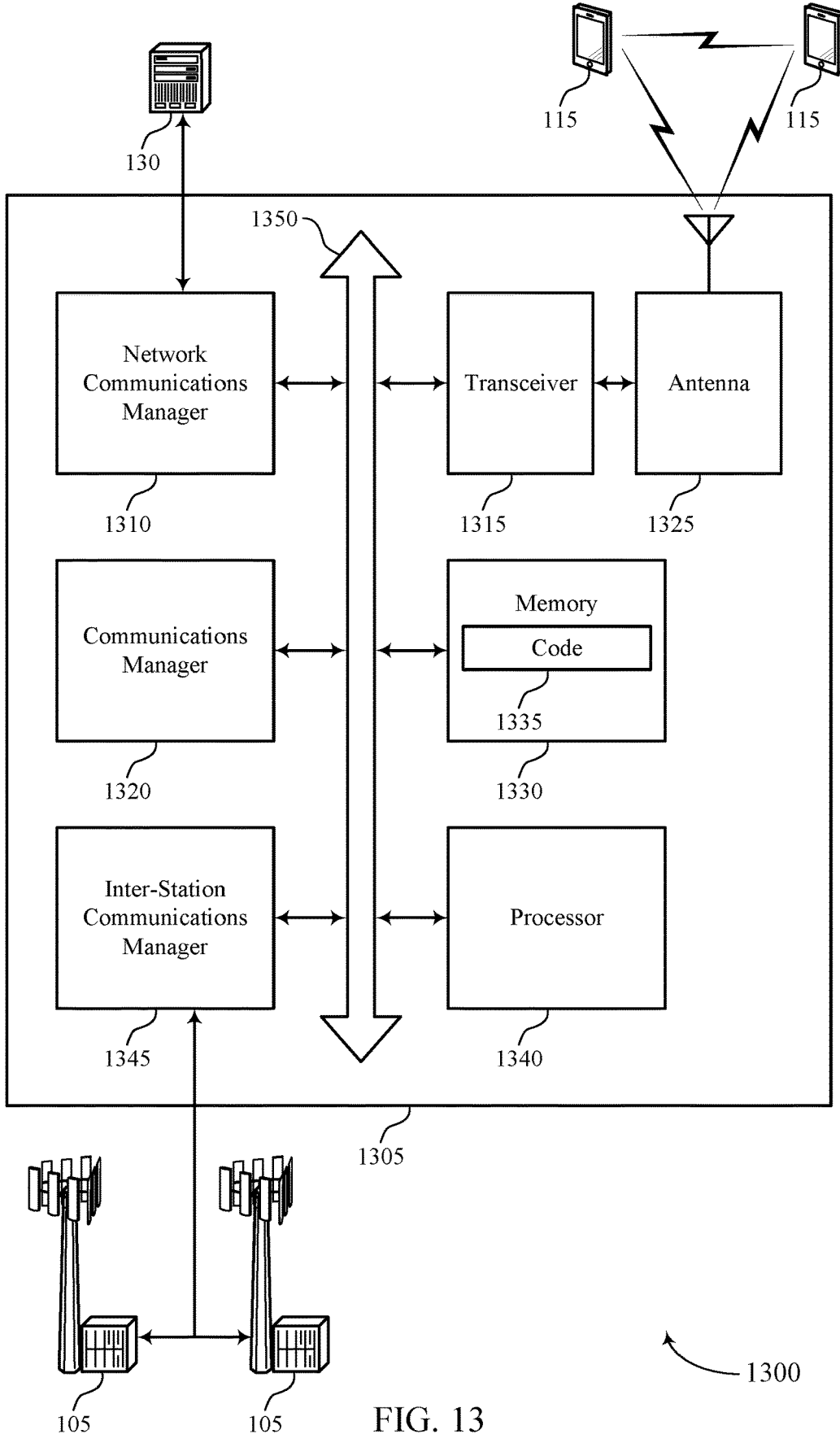
FIG. 13 shows a diagram of a system including a device that supports null resources configuration for channel estimation in accordance with aspects of the present disclosure.

FIG. 13 shows a diagram of a system 1300 including a device 1305 that supports null resources configuration for channel estimation in accordance with aspects of the present disclosure. The device 1305 may be an example of or include the components of a device 1005, a device 1105, or a base station 105 as described herein. The device 1305 may communicate wirelessly with one or more base stations 105, UEs 115, or any combination thereof. The device 1305 may include components for bi-directional voice and data communications including components for transmitting and receiving communications, such as a communications manager 1320, a network communications manager 1310, a transceiver 1315, an antenna 1325, a memory 1330, code 1335, a processor 1340, and an inter-station communications manager 1345. These components may be in electronic communication or otherwise coupled (e.g., operatively, communicatively, functionally, electronically, electrically) via one or more buses (e.g., a bus 1350).

The network communications manager 1310 may manage communications with a core network 130 (e.g., via one or more wired backhaul links). For example, the network communications manager 1310 may manage the transfer of data communications for client devices, such as one or more UEs 115.

In some cases, the device 1305 may include a single antenna 1325. However, in some other cases the device 1305 may have more than one antenna 1325, which may be capable of concurrently transmitting or receiving multiple wireless transmissions. The transceiver 1315 may communicate bi-directionally, via the one or more antennas 1325, wired, or wireless links as described herein. For example, the transceiver 1315 may represent a wireless transceiver and may communicate bi-directionally with another wireless transceiver. The transceiver 1315 may also include a modem to modulate the packets, to provide the modulated packets to one or more antennas 1325 for transmission, and to demodulate packets received from the one or more antennas 1325. The transceiver 1315, or the transceiver 1315 and one or more antennas 1325, may be an example of a transmitter 1015, a transmitter 1115, a receiver 1010, a receiver 1110, or any combination thereof or component thereof, as described herein.

The memory 1330 may include RAM and ROM. The memory 1330 may store computer-readable, computer-executable code 1335 including instructions that, when executed by the processor 1340, cause the device 1305 to perform various functions described herein. The code 1335 may be stored in a non-transitory computer-readable medium such as system memory or another type of memory. In some cases, the code 1335 may not be directly executable by the processor 1340 but may cause a computer (e.g., when compiled and executed) to perform functions described herein. In some cases, the memory 1330 may contain, among other things, a BIOS which may control basic hardware or software operation such as the interaction with peripheral components or devices.

The processor 1340 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1340 may be configured to operate a memory array using a memory controller. In some other cases, a memory controller may be integrated into the processor 1340. The processor 1340 may be configured to execute computer-readable instructions stored in a memory (e.g., the memory 1330) to cause the device 1305 to perform various functions (e.g., functions or tasks supporting null resources configuration for channel estimation). For example, the device 1305 or a component of the device 1305 may include a processor 1340 and memory 1330 coupled to the processor 1340, the processor 1340 and memory 1330 configured to perform various functions described herein.

The inter-station communications manager 1345 may manage communications with other base stations 105, and may include a controller or scheduler for controlling communications with UEs 115 in cooperation with other base stations 105. For example, the inter-station communications manager 1345 may coordinate scheduling for transmissions to UEs 115 for various interference mitigation techniques such as beamforming or joint transmission. In some examples, the inter-station communications manager 1345 may provide an X2 interface within an LTE/LTE-A wireless communications network technology to provide communication between base stations 105.

The communications manager 1320 may support wireless communications by a base station in accordance with examples as disclosed herein. For example, the communications manager 1320 may be configured as or otherwise support a means for identifying a first configuration for a set of DMRS resources in a first set of time periods of an uplink data channel and a second configuration for a set of null resources in a second set of time periods of the uplink data channel, where time periods of the first set of time periods are nonoverlapping with time periods of the second set of time periods. The communications manager 1320 may be configured as or otherwise support a means for performing a channel estimation procedure on the uplink data channel based on the set of null resources and the set of DMRS resources. The communications manager 1320 may be configured as or otherwise support a means for processing uplink data in uplink data resources of the uplink data channel based on the channel estimation procedure.

By including or configuring the communications manager 1320 in accordance with examples as described herein, the device 1305 (e.g., a base station 105) may support techniques for improved communication reliability and improved utilization of processing capability. For example, the device 1305 may perform a channel estimation based on energy received via a set of null resources, measured DMRSs, or both. By performing the channel estimation based on the set of null resources, the device 1305 may allow for the a more accurate Rnn estimation.

In some examples, a number of receiver components of the device 1305 may be high, or the device 1305 may receive data from multiple other devices (e.g., the dimensionality of the device 1305 may be high), which may result in a large number of elements to be estimated in the Rnn matrix. By measuring the set of null resources to perform the Rnn estimation, the device 1305 may increase the processing gain for the Rnn estimation. As the processing gain increases, the quality of the Rnn estimation by the device 1305 may improve, which may allow for improved demodulation of data by the device 1305. The device 1305 may thereby receive and demodulate data more efficiently and accurately by estimating Rnn based on a set of null resources without negatively impacting the channel spectral efficiency or channel throughput.

In some examples, the communications manager 1320 may be configured to perform various operations (e.g., receiving, monitoring, transmitting) using or otherwise in cooperation with the transceiver 1315, the one or more antennas 1325, or any combination thereof. Although the communications manager 1320 is illustrated as a separate component, in some examples, one or more functions described with reference to the communications manager 1320 may be supported by or performed by the processor 1340, the memory 1330, the code 1335, or any combination thereof. For example, the code 1335 may include instructions executable by the processor 1340 to cause the device 1305 to perform various aspects of null resources configuration for channel estimation as described herein, or the processor 1340 and the memory 1330 may be otherwise configured to perform or support such operations.

FIG. 14 shows a flowchart illustrating a method 1400 that supports null resources configuration for channel estimation in accordance with aspects of the present disclosure. The operations of the method 1400 may be implemented by a UE or its components as described herein. For example, the operations of the method 1400 may be performed by a UE 115 as described with reference to FIGS. 1 through 9. In some examples, a UE may execute a set of instructions to control the functional elements of the UE to perform the described functions. Additionally or alternatively, the UE may perform aspects of the described functions using special-purpose hardware.

At 1405, the method may include identifying a first configuration for a set of DMRS resources in a first set of time periods of a downlink data channel and a second configuration for a set of null resources in a second set of time periods of the downlink data channel, where time periods of the first set of time periods are nonoverlapping with time periods of the second set of time periods. The operations of 1405 may be performed in accordance with examples as disclosed herein. In some examples, aspects of the operations of 1405 may be performed by a resource configuration component 825 as described with reference to FIG. 8.

At 1410, the method may include performing a channel estimation procedure on the downlink data channel based on the set of null resources and the set of DMRS resources. The operations of 1410 may be performed in accordance with examples as disclosed herein. In some examples, aspects of the operations of 1410 may be performed by a channel estimation component 830 as described with reference to FIG. 8.

At 1415, the method may include processing downlink data in downlink data resources of the downlink data channel based on the channel estimation procedure. The operations of 1415 may be performed in accordance with examples as disclosed herein. In some examples, aspects of the operations of 1415 may be performed by a processing component 835 as described with reference to FIG. 8.

FIG. 15 shows a flowchart illustrating a method 1500 that supports null resources configuration for channel estimation in accordance with aspects of the present disclosure. The operations of the method 1500 may be implemented by a UE or its components as described herein. For example, the operations of the method 1500 may be performed by a UE 115 as described with reference to FIGS. 1 through 9. In some examples, a UE may execute a set of instructions to control the functional elements of the UE to perform the described functions. Additionally or alternatively, the UE may perform aspects of the described functions using special-purpose hardware.

At 1505, the method may include identifying a first configuration for a set of DMRS resources in a first set of time periods of a downlink data channel and a second configuration for a set of null resources in a second set of time periods of the downlink data channel, where time periods of the first set of time periods are nonoverlapping with time periods of the second set of time periods. The operations of 1505 may be performed in accordance with examples as disclosed herein. In some examples, aspects of the operations of 1505 may be performed by a resource configuration component 825 as described with reference to FIG. 8.

At 1510, the method may include identifying a time and frequency resource pattern for the set of null resources, where the second configuration indicates rate matching of the downlink data resources around the time and frequency resource pattern for the set of null resources. The operations of 1510 may be performed in accordance with examples as disclosed herein. In some examples, aspects of the operations of 1510 may be performed by a rate matching component 840 as described with reference to FIG. 8.

At 1515, the method may include performing a channel estimation procedure on the downlink data channel based on the set of null resources and the set of DMRS resources. The operations of 1515 may be performed in accordance with examples as disclosed herein. In some examples, aspects of the operations of 1515 may be performed by a channel estimation component 830 as described with reference to FIG. 8.

At 1520, the method may include processing downlink data in downlink data resources of the downlink data channel based on the channel estimation procedure. The operations of 1520 may be performed in accordance with examples as disclosed herein. In some examples, aspects of the operations of 1520 may be performed by a processing component 835 as described with reference to FIG. 8.

FIG. 16 shows a flowchart illustrating a method 1600 that supports null resources configuration for channel estimation in accordance with aspects of the present disclosure. The operations of the method 1600 may be implemented by a UE or its components as described herein. For example, the operations of the method 1600 may be performed by a UE 115 as described with reference to FIGS. 1 through 9. In some examples, a UE may execute a set of instructions to control the functional elements of the UE to perform the described functions. Additionally or alternatively, the UE may perform aspects of the described functions using special-purpose hardware.

At 1605, the method may include identifying a first configuration for a set of DMRS resources in a first set of time periods of a downlink data channel and a second configuration for a set of null resources in a second set of time periods of the downlink data channel, where time periods of the first set of time periods are nonoverlapping with time periods of the second set of time periods. The operations of 1605 may be performed in accordance with examples as disclosed herein. In some examples, aspects of the operations of 1605 may be performed by a resource configuration component 825 as described with reference to FIG. 8.

At 1610, the method may include identifying a time and frequency resource pattern for the set of null resources, where the second configuration indicates puncturing of the downlink data resources with the set of null resources. The operations of 1610 may be performed in accordance with examples as disclosed herein. In some examples, aspects of the operations of 1610 may be performed by a puncturing component 845 as described with reference to FIG. 8.

At 1615, the method may include performing a channel estimation procedure on the downlink data channel based on the set of null resources and the set of DMRS resources. The operations of 1615 may be performed in accordance with examples as disclosed herein. In some examples, aspects of the operations of 1615 may be performed by a channel estimation component 830 as described with reference to FIG. 8.

At 1620, the method may include processing downlink data in downlink data resources of the downlink data channel based on the channel estimation procedure. The operations of 1620 may be performed in accordance with examples as disclosed herein. In some examples, aspects of the operations of 1620 may be performed by a processing component 835 as described with reference to FIG. 8.

FIG. 17 shows a flowchart illustrating a method 1700 that supports null resources configuration for channel estimation in accordance with aspects of the present disclosure. The operations of the method 1700 may be implemented by a UE or its components as described herein. For example, the operations of the method 1700 may be performed by a UE 115 as described with reference to FIGS. 1 through 9. In some examples, a UE may execute a set of instructions to control the functional elements of the UE to perform the described functions. Additionally or alternatively, the UE may perform aspects of the described functions using special-purpose hardware.

At 1705, the method may include identifying a first configuration for a set of DMRS resources in a first set of time periods of a downlink data channel and a second configuration for a set of null resources in a second set of time periods of the downlink data channel, where time periods of the first set of time periods are nonoverlapping with time periods of the second set of time periods. The operations of 1705 may be performed in accordance with examples as disclosed herein. In some examples, aspects of the operations of 1705 may be performed by a resource configuration component 825 as described with reference to FIG. 8.

At 1710, the method may include measuring received energy within the set of null resources. The operations of 1710 may be performed in accordance with examples as disclosed herein. In some examples, aspects of the operations of 1710 may be performed by a null resource component 850 as described with reference to FIG. 8.

At 1715, the method may include measuring reference signals within the set of DMRS resources. The operations of 1715 may be performed in accordance with examples as disclosed herein. In some examples, aspects of the operations of 1715 may be performed by a DMRS component 855 as described with reference to FIG. 8.

At 1720, the method may include calculating a noise and interference estimate for the downlink data channel based on the measured received energy and the measured reference signals. The operations of 1720 may be performed in accordance with examples as disclosed herein. In some examples, aspects of the operations of 1720 may be performed by a channel estimation component 830 as described with reference to FIG. 8.

At 1725, the method may include performing a channel estimation procedure on the downlink data channel based on the set of null resources and the set of DMRS resources. The operations of 1725 may be performed in accordance with examples as disclosed herein. In some examples, aspects of the operations of 1725 may be performed by a channel estimation component 830 as described with reference to FIG. 8.

At 1730, the method may include processing downlink data in downlink data resources of the downlink data channel based on the channel estimation procedure. The operations of 1730 may be performed in accordance with examples as disclosed herein. In some examples, aspects of the operations of 1730 may be performed by a processing component 835 as described with reference to FIG. 8.

FIG. 18 shows a flowchart illustrating a method 1800 that supports null resources configuration for channel estimation in accordance with aspects of the present disclosure. The operations of the method 1800 may be implemented by a base station or its components as described herein. For example, the operations of the method 1800 may be performed by a base station 105 as described with reference to FIGS. 1 through 5 and 10 through 13. In some examples, a base station may execute a set of instructions to control the functional elements of the base station to perform the described functions. Additionally or alternatively, the base station may perform aspects of the described functions using special-purpose hardware.

At 1805, the method may include identifying a first configuration for a set of DMRS resources in a first set of time periods of an uplink data channel and a second configuration for a set of null resources in a second set of time periods of the uplink data channel, where time periods of the first set of time periods are nonoverlapping with time periods of the second set of time periods. The operations of 1805 may be performed in accordance with examples as disclosed herein. In some examples, aspects of the operations of 1805 may be performed by a resource configuration component 1225 as described with reference to FIG. 12.

At 1810, the method may include performing a channel estimation procedure on the uplink data channel based on the set of null resources and the set of DMRS resources. The operations of 1810 may be performed in accordance with examples as disclosed herein. In some examples, aspects of the operations of 1810 may be performed by a channel estimation component 1230 as described with reference to FIG. 12.

At 1815, the method may include processing uplink data in uplink data resources of the uplink data channel based on the channel estimation procedure. The operations of 1815 may be performed in accordance with examples as disclosed herein. In some examples, aspects of the operations of 1815 may be performed by a processing component 1235 as described with reference to FIG. 12.

FIG. 19 shows a flowchart illustrating a method 1900 that supports null resources configuration for channel estimation in accordance with aspects of the present disclosure. The operations of the method 1900 may be implemented by a base station or its components as described herein. For example, the operations of the method 1900 may be performed by a base station 105 as described with reference to FIGS. 1 through 5 and 10 through 13. In some examples, a base station may execute a set of instructions to control the functional elements of the base station to perform the described functions. Additionally or alternatively, the base station may perform aspects of the described functions using special-purpose hardware.

At 1905, the method may include identifying a first configuration for a set of DMRS resources in a first set of time periods of an uplink data channel and a second configuration for a set of null resources in a second set of time periods of the uplink data channel, where time periods of the first set of time periods are nonoverlapping with time periods of the second set of time periods. The operations of 1905 may be performed in accordance with examples as disclosed herein. In some examples, aspects of the operations of 1905 may be performed by a resource configuration component 1225 as described with reference to FIG. 12.

At 1910, the method may include identifying a time and frequency resource pattern for the set of null resources. The operations of 1910 may be performed in accordance with examples as disclosed herein. In some examples, aspects of the operations of 1910 may be performed by a null resource component 1240 as described with reference to FIG. 12.

At 1915, the method may include transmitting, to a UE, an indication of the second configuration, where the second configuration indicates rate matching of the uplink data resources around the time and frequency resource pattern for the set of null resources. The operations of 1915 may be performed in accordance with examples as disclosed herein. In some examples, aspects of the operations of 1915 may be performed by a rate matching component 1245 as described with reference to FIG. 12.

At 1920, the method may include performing a channel estimation procedure on the uplink data channel based on the set of null resources and the set of DMRS resources. The operations of 1920 may be performed in accordance with examples as disclosed herein. In some examples, aspects of the operations of 1920 may be performed by a channel estimation component 1230 as described with reference to FIG. 12.

At 1925, the method may include processing uplink data in uplink data resources of the uplink data channel based on the channel estimation procedure. The operations of 1925 may be performed in accordance with examples as disclosed herein. In some examples, aspects of the operations of 1925 may be performed by a processing component 1235 as described with reference to FIG. 12.

Figure 20:
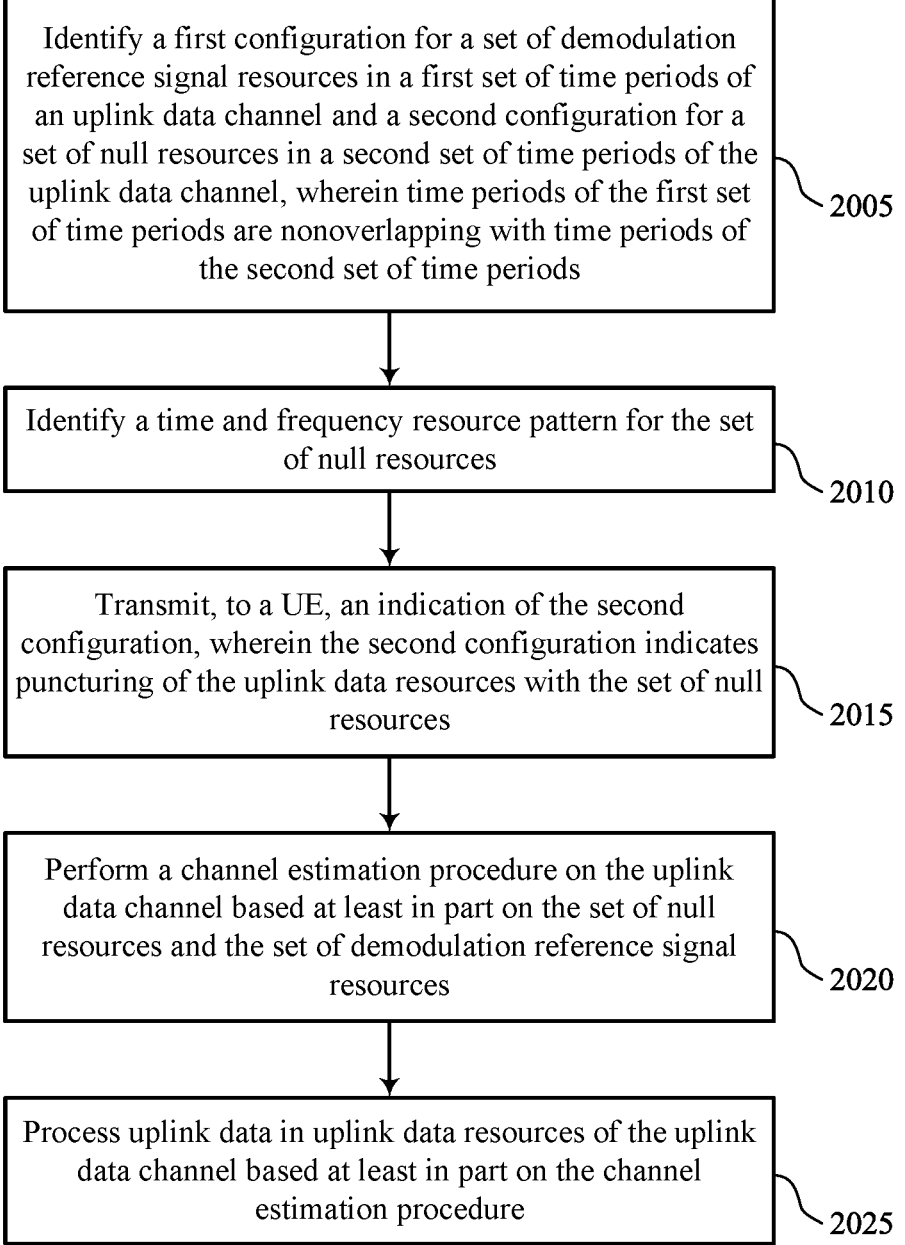

FIG. 20 shows a flowchart illustrating a method 2000 that supports null resources configuration for channel estimation in accordance with aspects of the present disclosure. The operations of the method 2000 may be implemented by a base station or its components as described herein. For example, the operations of the method 2000 may be performed by a base station 105 as described with reference to FIGS. 1 through 5 and 10 through 13. In some examples, a base station may execute a set of instructions to control the functional elements of the base station to perform the described functions. Additionally or alternatively, the base station may perform aspects of the described functions using special-purpose hardware.

At 2005, the method may include identifying a first configuration for a set of DMRS resources in a first set of time periods of an uplink data channel and a second configuration for a set of null resources in a second set of time periods of the uplink data channel, where time periods of the first set of time periods are nonoverlapping with time periods of the second set of time periods. The operations of 2005 may be performed in accordance with examples as disclosed herein. In some examples, aspects of the operations of 2005 may be performed by a resource configuration component 1225 as described with reference to FIG. 12.

At 2010, the method may include identifying a time and frequency resource pattern for the set of null resources. The operations of 2010 may be performed in accordance with examples as disclosed herein. In some examples, aspects of the operations of 2010 may be performed by a null resource component 1240 as described with reference to FIG. 12.

At 2015, the method may include transmitting, to a UE, an indication of the second configuration, where the second configuration indicates puncturing of the uplink data resources with the set of null resources. The operations of 2015 may be performed in accordance with examples as disclosed herein. In some examples, aspects of the operations of 2015 may be performed by a puncturing component 1250 as described with reference to FIG. 12.

At 2020, the method may include performing a channel estimation procedure on the uplink data channel based on the set of null resources and the set of DMRS resources. The operations of 2020 may be performed in accordance with examples as disclosed herein. In some examples, aspects of the operations of 2020 may be performed by a channel estimation component 1230 as described with reference to FIG. 12.

At 2025, the method may include processing uplink data in uplink data resources of the uplink data channel based on the channel estimation procedure. The operations of 2025 may be performed in accordance with examples as disclosed herein. In some examples, aspects of the operations of 2025 may be performed by a processing component 1235 as described with reference to FIG. 12.

The following provides an overview of aspects of the present disclosure:

Aspect 1: A method for wireless communications by a user equipment (UE), comprising: identifying a first configuration for a set of demodulation reference signal (DMRS) resources in a first set of time periods of a downlink data channel and a second configuration for a set of null resources in a second set of time periods of the downlink data channel, wherein time periods of the first set of time periods are nonoverlapping with time periods of the second set of time periods; performing a channel estimation procedure on the downlink data channel based at least in part on the set of null resources and the set of DMRS resources; and processing downlink data in downlink data resources of the downlink data channel based at least in part on the channel estimation procedure.

Aspect 2: The method of aspect 1, further comprising: identifying a time and frequency resource pattern for the set of null resources, wherein the second configuration indicates rate matching of the downlink data resources around the time and frequency resource pattern for the set of null resources.

Aspect 3: The method of aspect 2, wherein the time and frequency resource pattern for the set of null resources is based at least in part on a time and frequency resource pattern for the set of DMRS resources.

Aspect 4: The method of aspect 2, wherein the time and frequency resource pattern for the set of null resources is based at least in part on a comb pattern of resource elements defined with respect to the downlink data channel.

Aspect 5: The method of any of aspects 2 through 4, wherein identifying the second configuration comprises receiving radio resource control (RRC) signaling indicating the second configuration.

Aspect 6: The method of any of aspects 2 through 4, wherein identifying the second configuration comprises receiving downlink control information (DCI) indicating the second configuration.

Aspect 7: The method of aspect 6, wherein the DCI comprises an index to an indication of the time and frequency resource pattern for the set of null resources in a time domain resource allocation (TDRA) table.

Aspect 8: The method of aspect 6, wherein the DCI comprises a bit field indicating the second configuration.

Aspect 9: The method of any of aspects 2 through 8, further comprising: calculating a transport block size (TBS) for the downlink data channel based at least in part on a number of resource elements associated with the set of null resources.

Aspect 10: The method of aspect 1, further comprising: identifying a time and frequency resource pattern for the set of null resources, wherein the second configuration indicates puncturing of the downlink data resources with the set of null resources.

Aspect 11: The method of aspect 10, further comprising: receiving DCI indicating the second configuration.

Aspect 12: The method of aspect 11, wherein the DCI comprises an indication that puncturing is enabled for the downlink data channel.

Aspect 13: The method of aspect 11, wherein the DCI comprises an indication that puncturing is disabled for the downlink data channel.

Aspect 14: The method of any of aspects 10 through 13, wherein the UE is configured to determine whether the set of null resources punctured the downlink data resources based at least in part on a set of DCI parameters configured by a network.

Aspect 15: The method of aspect 14, wherein the set of DCI parameters comprises one or more radio network temporary identifiers (RNTIs), one or more DCI formats, one or more search space identifiers (IDs), one or more control resource set (CORESET) IDs, or a combination thereof.

Aspect 16: The method of any of aspects 1 through 15, further comprising: determining that the set of null resources are unavailable resources for the downlink data resources.

Aspect 17: The method of any of aspects 1 through 16, wherein performing the channel estimation procedure on the downlink data channel further comprises: measuring received energy within the set of null resources; measuring reference signals within the set of DMRS resources; and calculating a noise and interference estimate for the downlink data channel based at least in part on the measured received energy and the measured reference signals.

Aspect 18: The method of aspect 17, wherein the noise and interference estimate comprises a channel noise and interference covariance matrix.

Aspect 19: The method of aspect 18, further comprising: demodulating the downlink data based at least in part on the channel noise and interference covariance matrix.

Aspect 20: The method of any of aspects 1 through 19, wherein the UE comprises a plurality of receiver components.

Aspect 21: A method for wireless communications by a base station, comprising: identifying a first configuration for a set of DMRS resources in a first set of time periods of an uplink data channel and a second configuration for a set of null resources in a second set of time periods of the uplink data channel, wherein time periods of the first set of time periods are nonoverlapping with time periods of the second set of time periods; performing a channel estimation procedure on the uplink data channel based at least in part on the set of null resources and the set of DMRS resources; and processing uplink data in uplink data resources of the uplink data channel based at least in part on the channel estimation procedure.

Aspect 22: The method of aspect 21, further comprising: identifying a time and frequency resource pattern for the set of null resources; and transmitting, to a UE, an indication of the second configuration, wherein the second configuration indicates rate matching of the uplink data resources around the time and frequency resource pattern for the set of null resources.

Aspect 23: The method of aspect 22, wherein the time and frequency resource pattern for the set of null resources is based at least in part on a time and frequency resource pattern for the set of DMRS resources.

Aspect 24: The method of aspect 22, wherein the time and frequency resource pattern for the set of null resources is based at least in part on a comb pattern of resource elements defined with respect to the uplink data channel.

Aspect 25: The method of any of aspects 22 through 24, further comprising: transmitting the indication of the second configuration via RRC information signaling.

Aspect 26: The method of any of aspects 22 through 24, further comprising: transmitting the indication of the second configuration via DCI.

Aspect 27: The method of aspect 26, wherein the DCI comprises an index to an indication of the time and frequency resource pattern for the set of null resources in a TDRA table.

Aspect 28: The method of any of aspects 22 through 27, further comprising: calculating a TBS for the uplink data channel based at least in part on a number of resource elements associated with the set of null resources.

Aspect 29: The method of any of aspects 21 through 28, further comprising: identifying a time and frequency resource pattern for the set of null resources; and transmitting, to a UE, an indication of the second configuration, wherein the second configuration indicates puncturing of the uplink data resources with the set of null resources.

Aspect 30: The method of aspect 29, further comprising: transmitting the indication of the second configuration via DCI, wherein the DCI comprises an indication that puncturing is enabled for the uplink data channel.

Aspect 31: The method of aspect 29, further comprising: transmitting the indication of the second configuration via DCI, wherein the DCI comprises an indication that puncturing is enabled for the uplink data channel.

Aspect 32: The method of any of aspects 29 through 31, further comprising: determining whether the set of null resources puncture the uplink data resources based at least in part on a set of parameters configured by a network; and transmitting DCI based at least in part on the set of parameters.

Aspect 33: The method of aspect 32, wherein the set of parameters comprises one or more RNTIs, one or more DCI formats, one or more search space IDs, one or more CORESET IDs, or a combination thereof.

Aspect 34: The method of any of aspects 21 through 33, further comprising: determining that the set of null resources are unavailable resources for the uplink data resources.

Aspect 35: The method of any of aspects 21 through 34, wherein performing the channel estimation procedure on the uplink data channel further comprises: measuring received energy within the set of null resources; measuring reference signals within the set of DMRS resources; and calculating a noise and interference estimate for the uplink data channel based at least in part on the measured received energy and the measured reference signals.

Aspect 36: The method of aspect 35, wherein the noise and interference estimate comprises a channel noise and interference covariance matrix.

Aspect 37: The method of aspect 36, further comprising: demodulating the uplink data based at least in part on the channel noise and interference covariance matrix.

Aspect 38: The method of any of aspects 21 through 37, wherein the base station receives the uplink data from a plurality of UEs.

Aspect 39: The method of any of aspects 21 through 38, wherein the base station comprises a plurality of receiver components.

Aspect 40: An apparatus for wireless communications by a UE, comprising a processor; memory coupled with the processor; and instructions stored in the memory and executable by the processor to cause the apparatus to perform a method of any of aspects 1 through 20.

Aspect 41: An apparatus for wireless communications by a UE, comprising at least one means for performing a method of any of aspects 1 through 20.

Aspect 42: A non-transitory computer-readable medium storing code for wireless communications by a UE, the code comprising instructions executable by a processor to perform a method of any of aspects 1 through 20.

Aspect 43: An apparatus for wireless communications by a base station, comprising a processor; memory coupled with the processor; and instructions stored in the memory and executable by the processor to cause the apparatus to perform a method of any of aspects 21 through 39.

Aspect 44: An apparatus for wireless communications by a base station, comprising at least one means for performing a method of any of aspects 21 through 39.

Aspect 45: A non-transitory computer-readable medium storing code for wireless communications by a base station, the code comprising instructions executable by a processor to perform a method of any of aspects 21 through 39.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communications by a user equipment (UE), comprising:

receiving control signaling that indicates a first configuration for a set of demodulation reference signal resources in a first set of time periods of a downlink data channel and a second configuration for a set of null resources in a second set of time periods of the downlink data channel, wherein time periods of the first set of time periods are nonoverlapping with time periods of the second set of time periods;

performing a channel estimation procedure on the downlink data channel based at least in part on the set of null resources and the set of demodulation reference signal resources; and processing downlink data in downlink data resources of the downlink data channel based at least in part on the channel estimation procedure.

2. The method of claim 1, further comprising:

identifying a time and frequency resource pattern for the set of null resources, wherein the second configuration indicates rate matching of the downlink data resources around the time and frequency resource pattern for the set of null resources.

3. The method of claim 2, wherein the time and frequency resource pattern for the set of null resources is based at least in part on a time and frequency resource pattern for the set of demodulation reference signal resources.

4. The method of claim 2, wherein the time and frequency resource pattern for the set of null resources is based at least in part on a comb pattern of resource elements defined with respect to the downlink data channel.

5. The method of claim 2, wherein receiving the control signaling that indicates the second configuration comprises receiving radio resource control signaling indicating the second configuration.

6. The method of claim 2, wherein receiving control signaling that indicates the second configuration comprises receiving downlink control information indicating the second configuration.

7. The method of claim 6, wherein the downlink control information comprises an index to an indication of the time and frequency resource pattern for the set of null resources in a time domain resource allocation table.

8. The method of claim 6, wherein the downlink control information comprises a bit field indicating the second configuration.

9. The method of claim 2, further comprising:

calculating a transport block size for the downlink data channel based at least in part on a number of resource elements associated with the set of null resources.

10. The method of claim 1, further comprising:

identifying a time and frequency resource pattern for the set of null resources, wherein the second configuration indicates puncturing of the downlink data resources with the set of null resources.

11. The method of claim 10, further comprising:

receiving downlink control information indicating the second configuration.

12. The method of claim 11, wherein the downlink control information comprises an indication that puncturing is enabled for the downlink data channel.

13. The method of claim 11, wherein the downlink control information comprises an indication that puncturing is disabled for the downlink data channel.

14. The method of claim 10, wherein the UE is configured to determine whether the set of null resources punctured the downlink data resources based at least in part on a set of downlink control information parameters configured by a network.

15. The method of claim 14, wherein the set of downlink control information parameters comprises one or more radio network temporary identifiers, one or more downlink control information formats, one or more search space identifiers, one or more control resource set identifiers, or a combination thereof.

16. The method of claim 1, further comprising:

determining that the set of null resources are unavailable resources for the downlink data resources.

17. The method of claim 1, wherein performing the channel estimation procedure on the downlink data channel further comprises:

measuring received energy within the set of null resources;

measuring reference signals within the set of demodulation reference signal resources; and calculating a noise and interference estimate for the downlink data channel based at least in part on the measured received energy and the measured reference signals.

18. The method of claim 17, wherein the noise and interference estimate comprises a channel noise and interference covariance matrix.

19. The method of claim 18, further comprising:

demodulating the downlink data based at least in part on the channel noise and interference covariance matrix.

20. The method of claim 1, wherein the UE comprises a plurality of receiver components.

21. A method for wireless communications by a network entity, comprising:

identifying a first configuration for a set of demodulation reference signal resources in a first set of time periods of an uplink data channel and a second configuration for a set of null resources in a second set of time periods of the uplink data channel, wherein time periods of the first set of time periods are nonoverlapping with time periods of the second set of time periods;

performing a channel estimation procedure on the uplink data channel based at least in part on the set of null resources and the set of demodulation reference signal resources; and processing uplink data in uplink data resources of the uplink data channel based at least in part on the channel estimation procedure.

22. The method of claim 21, further comprising:

identifying a time and frequency resource pattern for the set of null resources; and transmitting, to a user equipment (UE), an indication of the second configuration, wherein the second configuration indicates rate matching of the uplink data resources around the time and frequency resource pattern for the set of null resources.

23. The method of claim 22, wherein the time and frequency resource pattern for the set of null resources is based at least in part on a time and frequency resource pattern for the set of demodulation reference signal resources.

24. The method of claim 22, wherein the time and frequency resource pattern for the set of null resources is based at least in part on a comb pattern of resource elements defined with respect to the uplink data channel.

25. The method of claim 21, further comprising:

identifying a time and frequency resource pattern for the set of null resources; and transmitting, to a user equipment (UE), an indication of the second configuration, wherein the second configuration indicates puncturing of the uplink data resources with the set of null resources.

26. The method of claim 25, further comprising:

transmitting the indication of the second configuration via downlink control information, wherein the downlink control information comprises an indication that puncturing is enabled for the uplink data channel.

27. The method of claim 25, further comprising:

transmitting the indication of the second configuration via downlink control information, wherein the downlink control information comprises an indication that puncturing is disabled for the uplink data channel.

28. The method of claim 25, further comprising:

determining whether the set of null resources puncture the uplink data resources based at least in part on a set of parameters configured by a network; and transmitting downlink control information based at least in part on the set of parameters.

29. An apparatus for wireless communications by a user equipment (UE), comprising:

means for receiving control signaling that indicates a first configuration for a set of demodulation reference signal resources in a first set of time periods of a downlink data channel and a second configuration for a set of null resources in a second set of time periods of the downlink data channel, wherein time periods of the first set of time periods are nonoverlapping with time periods of the second set of time periods;

means for performing a channel estimation procedure on the downlink data channel based at least in part on the set of null resources and the set of demodulation reference signal resources; and means for processing downlink data in downlink data resources of the downlink data channel based at least in part on the channel estimation procedure.

30. An apparatus for wireless communications by a network entity, comprising:

means for identifying a first configuration for a set of demodulation reference signal resources in a first set of time periods of an uplink data channel and a second configuration for a set of null resources in a second set of time periods of the uplink data channel, wherein time periods of the first set of time periods are nonoverlapping with time periods of the second set of time periods;

means for performing a channel estimation procedure on the uplink data channel based at least in part on the set of null resources and the set of demodulation reference signal resources; and means for processing uplink data in uplink data resources of the uplink data channel based at least in part on the channel estimation procedure.

\* \* \* \* \*